US012646062B2

(12) United States Patent  
Vargas et al.

(10) Patent No.: US 12,646,062 B2  
(45) Date of Patent: Jun. 2, 2026

(54) TECHNIQUES AND SYSTEMS TO PERFORM AUTHENTICATION AND PAYMENT OPERATIONS WITH A CONTACTLESS CARD TO PROVIDE ITEMS AND SERVICES

(71) Applicant: Capital One Services, LLC, McLean, VA (US)

(72) Inventors: Cruz Vargas, Alexandria, VA (US); Bryant Yee, Washington, DC (US); Joshua Peters, Charlottesville, VA (US); Viraj Chaudhary, Katy, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/405,625

(22) Filed: Aug. 18, 2021

(65) Prior Publication Data

US 2023/0065163 A1 Mar. 2, 2023

(51) Int. Cl.
| | |
|---|---|
| *G06Q 20/32* | (2012.01) |
| *G06F 9/451* | (2018.01) |
| *G06F 16/23* | (2019.01) |
| *G06F 21/53* | (2013.01) |
| *G06Q 20/04* | (2012.01) |
| *G06Q 20/10* | (2012.01) |
| *G06Q 20/30* | (2012.01) |
| *G06Q 20/34* | (2012.01) |
| *G06Q 20/36* | (2012.01) |
| *G06Q 20/38* | (2012.01) |
| *G06Q 20/40* | (2012.01) |
| *G06Q 30/0645* | (2023.01) |

(Continued)

(52) U.S. Cl.
CPC ......... *G06Q 20/401* (2013.01); *G06Q 20/352* (2013.01); *G06Q 30/0645* (2013.01)

(58) Field of Classification Search
CPC . G06Q 20/401; G06Q 20/352; G06Q 30/0645
See application file for complete search history.

(56) References Cited

U.S. PATENT DOCUMENTS

| | | | |
|---|---|---|---|
| 4,683,553 | A | 7/1987 | Mollier |
| 4,827,113 | A | 5/1989 | Rikuna |

(Continued)

FOREIGN PATENT DOCUMENTS

| | | |
|---|---|---|
| CA | 3010336 A1 | 7/2017 |
| CN | 101192295 A | 6/2008 |

(Continued)

OTHER PUBLICATIONS

Batina, L. and Poll, E., "SmartCards and RFID", Course PowerPoint Presentation for IPA Security Course, Digital Security at University of Nijmegen, Netherlands (date unknown) 75 pages.

(Continued)

*Primary Examiner* — Jessica Lemieux
*Assistant Examiner* — Douglas W Pinsky
(74) *Attorney, Agent, or Firm* — KDW Firm PLLC

(57) ABSTRACT

Embodiments discussed herein are generally directed to systems, devices, methods, and techniques to perform authentication and payment operations with a contactless card to provide items and services.

18 Claims, 19 Drawing Sheets

(51) Int. Cl.

| | | |
|---|---|---|
| *G06Q 40/06* | (2012.01) |
| *G06T 7/10* | (2017.01) |
| *H04L 9/32* | (2006.01) |
| *H04L 29/06* | (2006.01) |
| *H04W 12/06* | (2021.01) |
| *H04W 12/08* | (2021.01) |
| G06F 21/31 | (2013.01) |
| G06F 21/32 | (2013.01) |
| G06F 21/45 | (2013.01) |
| G06F 21/57 | (2013.01) |
| G06Q 40/02 | (2023.01) |
| H04W 4/14 | (2009.01) |
| H04W 12/062 | (2021.01) |
| H04W 12/72 | (2021.01) |
| H04W 60/00 | (2009.01) |

(56) References Cited

U.S. PATENT DOCUMENTS

| | | |
|---|---|---|
| 4,910,773 A | 3/1990 | Hazard et al. |
| 5,036,461 A | 7/1991 | Elliott et al. |
| 5,363,448 A | 11/1994 | Koopman, Jr. et al. |
| 5,377,270 A | 12/1994 | Koopman, Jr. et al. |
| 5,533,126 A | 7/1996 | Hazard |
| 5,537,314 A | 7/1996 | Kanter |
| 5,590,038 A | 12/1996 | Pitroda |
| 5,592,553 A | 1/1997 | Guski et al. |
| 5,616,901 A | 4/1997 | Crandall |
| 5,666,415 A | 9/1997 | Kaufman |
| 5,763,373 A | 6/1998 | Robinson et al. |
| 5,764,789 A | 6/1998 | Pare, Jr. et al. |
| 5,768,373 A | 6/1998 | Lohstroh et al. |
| 5,778,072 A | 7/1998 | Samar |
| 5,796,827 A | 8/1998 | Coppersmith et al. |
| 5,832,090 A | 11/1998 | Raspotnik |
| 5,883,810 A | 3/1999 | Franklin et al. |
| 5,901,874 A | 5/1999 | Deters |
| 5,929,413 A | 7/1999 | Gardner |
| 5,960,411 A | 9/1999 | Hartman et al. |
| 6,021,203 A | 2/2000 | Douceur et al. |
| 6,049,328 A | 4/2000 | Vanderheiden |
| 6,058,373 A | 5/2000 | Blinn et al. |
| 6,061,666 A | 5/2000 | Do et al. |
| 6,105,013 A | 8/2000 | Curry et al. |
| 6,199,114 B1 | 3/2001 | White et al. |
| 6,199,762 B1 | 3/2001 | Hohle |
| 6,216,227 B1 | 4/2001 | Goldstein et al. |
| 6,227,447 B1 | 5/2001 | Campisano |
| 6,282,522 B1 | 8/2001 | Davis et al. |
| 6,324,271 B1 | 11/2001 | Sawyer et al. |
| 6,342,844 B1 | 1/2002 | Rozin |
| 6,367,011 B1 | 4/2002 | Lee et al. |
| 6,402,028 B1 | 6/2002 | Graham, Jr. et al. |
| 6,438,550 B1 | 8/2002 | Doyle et al. |
| 6,501,847 B2 | 12/2002 | Helot et al. |
| 6,572,015 B1 | 6/2003 | Norton |
| 6,631,197 B1 | 10/2003 | Taenzer |
| 6,641,050 B2 | 11/2003 | Kelley et al. |
| 6,655,585 B2 | 12/2003 | Shinn |
| 6,662,020 B1 | 12/2003 | Aaro et al. |
| 6,721,706 B1 | 4/2004 | Strubbe et al. |
| 6,731,778 B1 | 5/2004 | Oda et al. |
| 6,779,115 B1 | 8/2004 | Naim |
| 6,792,533 B2 | 9/2004 | Jablon |
| 6,829,711 B1 | 12/2004 | Kwok et al. |
| 6,834,271 B1 | 12/2004 | Hodgson et al. |
| 6,834,795 B1 | 12/2004 | Rasmussen et al. |
| 6,852,031 B1 | 2/2005 | Rowe |
| 6,865,547 B1 | 3/2005 | Brake, Jr. et al. |
| 6,873,260 B2 | 3/2005 | Lancos et al. |
| 6,877,656 B1 | 4/2005 | Jaros et al. |
| 6,889,198 B2 | 5/2005 | Kawan |
| 6,905,411 B2 | 6/2005 | Nguyen et al. |
| 6,910,627 B1 | 6/2005 | Simpson-Young et al. |
| 6,971,031 B2 | 11/2005 | Haala |
| 6,990,588 B1 | 1/2006 | Yasukura |
| 7,006,986 B1 | 2/2006 | Sines et al. |
| 7,085,931 B1 | 8/2006 | Smith et al. |
| 7,127,605 B1 | 10/2006 | Montgomery et al. |
| 7,128,274 B2 | 10/2006 | Kelley et al. |
| 7,140,550 B2 | 11/2006 | Ramachandran |
| 7,152,045 B2 | 12/2006 | Hoffman |
| 7,165,727 B2 | 1/2007 | de Jong |
| 7,175,076 B1 | 2/2007 | Block et al. |
| 7,202,773 B1 | 4/2007 | Oba et al. |
| 7,206,806 B2 | 4/2007 | Pineau |
| 7,232,073 B1 | 6/2007 | de Jong |
| 7,246,752 B2 | 7/2007 | Brown |
| 7,252,242 B2 | 8/2007 | Ho |
| 7,254,569 B2 | 8/2007 | Goodman et al. |
| 7,263,507 B1 | 8/2007 | Brake, Jr. et al. |
| 7,270,276 B2 | 9/2007 | Vayssiere |
| 7,278,025 B2 | 10/2007 | Saito et al. |
| 7,287,692 B1 | 10/2007 | Patel et al. |
| 7,290,709 B2 | 11/2007 | Tsai et al. |
| 7,306,143 B2 | 12/2007 | Bonneau, Jr. et al. |
| 7,319,986 B2 | 1/2008 | Praisner et al. |
| 7,325,132 B2 | 1/2008 | Takayama et al. |
| 7,373,515 B2 | 5/2008 | Owen et al. |
| 7,374,099 B2 | 5/2008 | de Jong |
| 7,375,616 B2 | 5/2008 | Rowse et al. |
| 7,380,710 B2 | 6/2008 | Brown |
| 7,424,977 B2 | 9/2008 | Smets et al. |
| 7,453,439 B1 | 11/2008 | Kushler et al. |
| 7,472,829 B2 | 1/2009 | Brown |
| 7,487,357 B2 | 2/2009 | Smith et al. |
| 7,527,208 B2 | 5/2009 | Hammad |
| 7,568,631 B2 | 8/2009 | Gibbs et al. |
| 7,584,153 B2 | 9/2009 | Brown et al. |
| 7,597,250 B2 | 10/2009 | Finn |
| 7,628,322 B2 | 12/2009 | Holtmanns et al. |
| 7,652,578 B2 | 1/2010 | Braun et al. |
| 7,689,832 B2 | 3/2010 | Talmor et al. |
| 7,703,142 B1 | 4/2010 | Wilson et al. |
| 7,748,609 B2 | 7/2010 | Sachdeva et al. |
| 7,748,617 B2 | 7/2010 | Gray |
| 7,748,636 B2 | 7/2010 | Finn |
| 7,762,457 B2 | 7/2010 | Bonalle et al. |
| 7,789,302 B2 | 9/2010 | Tame |
| 7,793,851 B2 | 9/2010 | Mullen |
| 7,796,013 B2 | 9/2010 | Murakami et al. |
| 7,801,799 B1 | 9/2010 | Brake, Jr. et al. |
| 7,801,829 B2 | 9/2010 | Gray et al. |
| 7,805,755 B2 | 9/2010 | Brown et al. |
| 7,809,643 B2 | 10/2010 | Phillips et al. |
| 7,827,115 B2 | 11/2010 | Weller et al. |
| 7,828,214 B2 | 11/2010 | Narendra et al. |
| 7,848,746 B2 | 12/2010 | Juels |
| 7,882,553 B2 | 2/2011 | Tuliani |
| 7,900,048 B2 | 3/2011 | Andersson |
| 7,908,216 B1 | 3/2011 | Davis et al. |
| 7,922,082 B2 | 4/2011 | Muscato |
| 7,933,589 B1 | 4/2011 | Mamdani et al. |
| 7,949,559 B2 | 5/2011 | Freiberg |
| 7,954,716 B2 | 6/2011 | Narendra et al. |
| 7,954,723 B2 | 6/2011 | Charrat |
| 7,962,369 B2 | 6/2011 | Rosenberg |
| 7,993,197 B2 | 8/2011 | Kaminkow |
| 8,005,426 B2 | 8/2011 | Huomo et al. |
| 8,010,405 B1 | 8/2011 | Bortolin et al. |
| RE42,762 E | 9/2011 | Shin et al. |
| 8,041,954 B2 | 10/2011 | Plesman |
| 8,060,012 B2 | 11/2011 | Sklovsky et al. |
| 8,074,877 B2 | 12/2011 | Mullen et al. |
| 8,082,450 B2 | 12/2011 | Frey et al. |
| 8,095,113 B2 | 1/2012 | Kean et al. |
| 8,099,332 B2 | 1/2012 | Lemay et al. |
| 8,103,249 B2 | 1/2012 | Markison |
| 8,108,687 B2 | 1/2012 | Ellis et al. |
| 8,127,143 B2 | 2/2012 | Abdallah et al. |
| 8,135,648 B2 | 3/2012 | Oram et al. |
| 8,140,010 B2 | 3/2012 | Symons et al. |

(56) References Cited

U.S. PATENT DOCUMENTS

| | | |
|---|---|---|
| 8,141,136 B2 | 3/2012 | Lee et al. |
| 8,150,321 B2 | 4/2012 | Winter et al. |
| 8,150,767 B2 | 4/2012 | Wankmueller |
| 8,186,602 B2 | 5/2012 | Itay et al. |
| 8,196,131 B1 | 6/2012 | von Behren et al. |
| 8,215,563 B2 | 7/2012 | Levy et al. |
| 8,224,753 B2 | 7/2012 | Atef et al. |
| 8,232,879 B2 | 7/2012 | Davis |
| 8,233,841 B2 | 7/2012 | Griffin et al. |
| 8,245,292 B2 | 8/2012 | Buer |
| 8,249,654 B1 | 8/2012 | Zhu |
| 8,266,451 B2 | 9/2012 | Leydier et al. |
| 8,276,814 B1 | 10/2012 | Davis |
| 8,285,329 B1 | 10/2012 | Zhu |
| 8,302,872 B2 | 11/2012 | Mullen |
| 8,312,519 B1 | 11/2012 | Bailey et al. |
| 8,316,237 B1 | 11/2012 | Felsher et al. |
| 8,332,272 B2 | 12/2012 | Fisher |
| 8,346,670 B2 | 1/2013 | Hasson |
| 8,365,988 B1 | 2/2013 | Medina, III et al. |
| 8,369,960 B2 | 2/2013 | Tran et al. |
| 8,371,501 B1 | 2/2013 | Hopkins |
| 8,381,307 B2 | 2/2013 | Cimino |
| 8,391,719 B2 | 3/2013 | Alameh et al. |
| 8,417,231 B2 | 4/2013 | Sanding et al. |
| 8,439,271 B2 | 5/2013 | Smets et al. |
| 8,475,367 B1 | 7/2013 | Yuen et al. |
| 8,489,112 B2 | 7/2013 | Roeding et al. |
| 8,511,542 B2 | 8/2013 | Pan |
| 8,511,547 B2 | 8/2013 | Rans |
| 8,519,822 B2 | 8/2013 | Riegebauer |
| 8,559,872 B2 | 10/2013 | Butler |
| 8,566,916 B1 | 10/2013 | Bailey et al. |
| 8,567,670 B2 | 10/2013 | Stanfield et al. |
| 8,572,386 B2 | 10/2013 | Takekawa et al. |
| 8,577,810 B1 | 11/2013 | Dalit et al. |
| 8,583,454 B2 | 11/2013 | Beraja et al. |
| 8,589,335 B2 | 11/2013 | Smith et al. |
| 8,594,730 B2 | 11/2013 | Bona et al. |
| 8,615,468 B2 | 12/2013 | Varadarajan |
| 8,620,218 B2 | 12/2013 | Awad |
| 8,667,285 B2 | 3/2014 | Coulier et al. |
| 8,723,941 B1 | 5/2014 | Shirbabadi et al. |
| 8,726,405 B1 | 5/2014 | Bailey et al. |
| 8,740,073 B2 | 6/2014 | Vijayshankar et al. |
| 8,750,514 B2 | 6/2014 | Gallo et al. |
| 8,752,189 B2 | 6/2014 | de Jong |
| 8,794,509 B2 | 8/2014 | Bishop et al. |
| 8,799,668 B2 | 8/2014 | Cheng |
| 8,806,592 B2 | 8/2014 | Ganesan |
| 8,807,440 B1 | 8/2014 | von Behren et al. |
| 8,811,892 B2 | 8/2014 | Khan et al. |
| 8,814,039 B2 | 8/2014 | Bishop et al. |
| 8,814,052 B2 | 8/2014 | Bona et al. |
| 8,818,867 B2 | 8/2014 | Baldwin et al. |
| 8,850,538 B1 | 9/2014 | Vernon et al. |
| 8,861,733 B2 | 10/2014 | Benteo et al. |
| 8,870,081 B2 | 10/2014 | Olson |
| 8,880,027 B1 | 11/2014 | Darringer |
| 8,888,002 B2 | 11/2014 | Marshall Chesney et al. |
| 8,898,088 B2 | 11/2014 | Springer et al. |
| 8,934,837 B2 | 1/2015 | Zhu et al. |
| 8,977,569 B2 | 3/2015 | Rao |
| 8,994,498 B2 | 3/2015 | Agrafioti et al. |
| 9,004,365 B2 | 4/2015 | Bona et al. |
| 9,038,893 B2 | 5/2015 | Kirkham |
| 9,038,894 B2 | 5/2015 | Khalid |
| 9,042,814 B2 | 5/2015 | Royston et al. |
| 9,047,531 B2 | 6/2015 | Showering et al. |
| 9,069,976 B2 | 6/2015 | Toole et al. |
| 9,081,948 B2 | 7/2015 | Magne |
| 9,104,853 B2 | 8/2015 | Venkataramani et al. |
| 9,118,663 B1 | 8/2015 | Bailey et al. |
| 9,122,964 B2 | 9/2015 | Krawczewicz |
| 9,129,199 B2 | 9/2015 | Spodak |
| 9,129,280 B2 | 9/2015 | Bona et al. |
| 9,152,832 B2 | 10/2015 | Royston et al. |
| 9,183,490 B2 | 11/2015 | Moreton |
| 9,203,800 B2 | 12/2015 | Izu et al. |
| 9,209,867 B2 | 12/2015 | Royston |
| 9,251,330 B2 | 2/2016 | Boivie et al. |
| 9,251,518 B2 | 2/2016 | Levin et al. |
| 9,258,715 B2 | 2/2016 | Borghei |
| 9,270,337 B2 | 2/2016 | Zhu et al. |
| 9,275,325 B2 | 3/2016 | Newcombe |
| 9,286,606 B2 | 3/2016 | Diamond |
| 9,306,626 B2 | 4/2016 | Hall et al. |
| 9,306,753 B1 | 4/2016 | Vandervort |
| 9,306,942 B1 | 4/2016 | Bailey et al. |
| 9,324,066 B2 | 4/2016 | Archer et al. |
| 9,324,067 B2 | 4/2016 | Van Os et al. |
| 9,332,587 B2 | 5/2016 | Salahshoor |
| 9,338,622 B2 | 5/2016 | Bjontegard |
| 9,373,141 B1 | 6/2016 | Shakkarwar |
| 9,379,841 B2 | 6/2016 | Fine et al. |
| 9,413,430 B2 | 8/2016 | Royston et al. |
| 9,413,768 B1 | 8/2016 | Gregg et al. |
| 9,420,496 B1 | 8/2016 | Indurkar |
| 9,426,132 B1 | 8/2016 | Alikhani |
| 9,432,339 B1 | 8/2016 | Bowness |
| 9,455,968 B1 | 9/2016 | Machani et al. |
| 9,473,509 B2 | 10/2016 | Arsanjani et al. |
| 9,491,626 B2 | 11/2016 | Sharma et al. |
| 9,501,776 B2 | 11/2016 | Martin |
| 9,553,637 B2 | 1/2017 | Yang et al. |
| 9,619,952 B1 | 4/2017 | Zhao et al. |
| 9,635,000 B1 | 4/2017 | Muftic |
| 9,665,858 B1 | 5/2017 | Kumar |
| 9,674,705 B2 | 6/2017 | Rose et al. |
| 9,679,286 B2 | 6/2017 | Colnot et al. |
| 9,680,942 B2 | 6/2017 | Dimmick |
| 9,710,744 B2 | 7/2017 | Wurmfeld |
| 9,710,804 B2 | 7/2017 | Zhou et al. |
| 9,740,342 B2 | 8/2017 | Paulsen et al. |
| 9,740,988 B1 | 8/2017 | Levin et al. |
| 9,763,097 B2 | 9/2017 | Robinson et al. |
| 9,767,329 B2 | 9/2017 | Forster |
| 9,769,662 B1 | 9/2017 | Queru |
| 9,773,151 B2 | 9/2017 | Mil'shtein et al. |
| 9,780,953 B2 | 10/2017 | Gaddam et al. |
| 9,891,823 B2 | 2/2018 | Feng et al. |
| 9,940,571 B1 | 4/2018 | Herrington |
| 9,949,065 B1 | 4/2018 | Zarakas |
| 9,953,323 B2 | 4/2018 | Candelore et al. |
| 9,961,194 B1 | 5/2018 | Wiechman et al. |
| 9,965,632 B2 | 5/2018 | Zarakas |
| 9,965,756 B2 | 5/2018 | Davis et al. |
| 9,965,911 B2 | 5/2018 | Wishne |
| 9,977,890 B2 | 5/2018 | Alberti |
| 9,978,056 B2 | 5/2018 | Seo |
| 9,978,058 B2 | 5/2018 | Wurmfeld et al. |
| 9,990,795 B2 | 6/2018 | Wurmfeld |
| 10,007,873 B2 | 6/2018 | Heo |
| 10,013,693 B2 | 7/2018 | Wyatt |
| 10,043,164 B2 | 8/2018 | Dogin et al. |
| 10,075,437 B1 | 9/2018 | Costigan et al. |
| 10,121,130 B2 | 11/2018 | Pinski |
| 10,129,648 B1 | 11/2018 | Hernandez et al. |
| 10,133,979 B1 | 11/2018 | Eidam et al. |
| 10,210,505 B2 | 2/2019 | Zarakas |
| 10,217,105 B1 | 2/2019 | Sangi et al. |
| 10,242,368 B1 | 3/2019 | Poole |
| 10,296,910 B1 | 5/2019 | Templeton |
| 10,332,102 B2 | 6/2019 | Zarakas |
| 10,360,557 B2 | 7/2019 | Locke |
| 10,380,471 B2 | 8/2019 | Locke |
| 10,395,244 B1 | 8/2019 | Mossler |
| 10,453,054 B2 | 10/2019 | Zarakas |
| 10,474,941 B2 | 11/2019 | Wurmfeld |
| 10,475,027 B2 | 11/2019 | Guise |
| 10,482,453 B2 | 11/2019 | Zarakas |
| 10,482,457 B2 | 11/2019 | Poole |
| 10,489,774 B2 | 11/2019 | Zarakas |
| 10,489,781 B1 | 11/2019 | Osborn |

(56)                References Cited

U.S. PATENT DOCUMENTS

| | | | |
|---|---|---|---|
| 10,510,070 | B2 | 12/2019 | Wurmfeld |
| 10,515,361 | B2 | 12/2019 | Zarakas |
| 10,535,068 | B2 | 1/2020 | Locke |
| 10,546,444 | B2 | 1/2020 | Osborn |
| 10,581,611 | B1 | 3/2020 | Osborn |
| 10,657,754 | B1 * | 5/2020 | Osborn .............. G06Q 20/4014 |
| 10,664,830 | B1 | 5/2020 | Rule |
| 10,685,349 | B2 | 6/2020 | Brickell |
| 10,797,882 | B2 | 10/2020 | Rule |
| 10,880,741 | B2 | 12/2020 | Zarakas |
| 10,909,525 | B1 | 2/2021 | Dhodapkar |
| 10,970,691 | B2 | 4/2021 | Koeppel |
| 10,984,416 | B2 | 4/2021 | Ilincic |
| 11,037,136 | B2 | 6/2021 | Rule |
| 11,062,098 | B1 | 7/2021 | Bergeron |
| 11,120,453 | B2 | 9/2021 | Rule |
| 11,138,593 | B1 | 10/2021 | Ho |
| 11,138,605 | B2 | 10/2021 | Aabye |
| 11,176,540 | B2 | 11/2021 | Gupta |
| 11,188,908 | B2 | 11/2021 | Locke |
| 11,216,806 | B2 | 1/2022 | Mossler |
| 11,297,958 | B2 | 4/2022 | Vukich |
| 11,334,872 | B2 | 5/2022 | Phillips |
| 11,361,173 | B2 | 6/2022 | Edwards |
| 11,392,933 | B2 | 7/2022 | Mossler |
| 11,392,935 | B2 | 7/2022 | Suresh |
| 11,416,844 | B1 | 8/2022 | Osterkamp |
| 11,423,392 | B1 | 8/2022 | Ho |
| 11,443,292 | B2 | 9/2022 | Sherif |
| 11,444,770 | B2 | 9/2022 | Wieker |
| 11,461,764 | B2 | 10/2022 | Rule |
| 11,481,764 | B2 | 10/2022 | Shakkarwar |
| 11,521,213 | B2 | 12/2022 | Rule |
| 11,551,200 | B1 | 1/2023 | Cook |
| 11,556,918 | B2 | 1/2023 | Mestre |
| 11,615,395 | B2 | 3/2023 | McHugh |
| 11,777,933 | B2 | 10/2023 | Moreton |
| 2001/0010723 | A1 | 8/2001 | Pinkas |
| 2001/0029485 | A1 | 10/2001 | Brody et al. |
| 2001/0034702 | A1 | 10/2001 | Mockett et al. |
| 2001/0054003 | A1 | 12/2001 | Chien et al. |
| 2002/0078345 | A1 | 6/2002 | Sandhu et al. |
| 2002/0093530 | A1 | 7/2002 | Krothapalli et al. |
| 2002/0100808 | A1 | 8/2002 | Norwood et al. |
| 2002/0120583 | A1 | 8/2002 | Keresman, III et al. |
| 2002/0152116 | A1 | 10/2002 | Yan et al. |
| 2002/0153424 | A1 | 10/2002 | Li |
| 2002/0165827 | A1 | 11/2002 | Gien et al. |
| 2003/0023554 | A1 | 1/2003 | Yap et al. |
| 2003/0034873 | A1 | 2/2003 | Chase et al. |
| 2003/0055727 | A1 | 3/2003 | Walker et al. |
| 2003/0078882 | A1 | 4/2003 | Sukeda et al. |
| 2003/0167350 | A1 | 9/2003 | Davis et al. |
| 2003/0208449 | A1 | 11/2003 | Diao |
| 2003/0220876 | A1 | 11/2003 | Burger |
| 2004/0015958 | A1 | 1/2004 | Veil et al. |
| 2004/0039919 | A1 | 2/2004 | Takayama et al. |
| 2004/0127256 | A1 | 7/2004 | Goldthwaite et al. |
| 2004/0215674 | A1 | 10/2004 | Odinak et al. |
| 2004/0230799 | A1 | 11/2004 | Davis |
| 2005/0044367 | A1 | 2/2005 | Gasparini et al. |
| 2005/0075985 | A1 | 4/2005 | Cartmell |
| 2005/0081038 | A1 | 4/2005 | Arditti Modiano et al. |
| 2005/0138387 | A1 | 6/2005 | Lam et al. |
| 2005/0156026 | A1 | 7/2005 | Ghosh et al. |
| 2005/0160049 | A1 | 7/2005 | Lundholm |
| 2005/0195975 | A1 | 9/2005 | Kawakita |
| 2005/0228997 | A1 | 10/2005 | Bicker |
| 2005/0247797 | A1 | 11/2005 | Ramachandran |
| 2005/0269402 | A1 | 12/2005 | Spitzer |
| 2006/0006230 | A1 | 1/2006 | Bear et al. |
| 2006/0040726 | A1 | 2/2006 | Szrek et al. |
| 2006/0041402 | A1 | 2/2006 | Baker |
| 2006/0044153 | A1 | 3/2006 | Dawidowsky |
| 2006/0047954 | A1 | 3/2006 | Sachdeva et al. |

| | | | |
|---|---|---|---|
| 2006/0085848 | A1 | 4/2006 | Aissi et al. |
| 2006/0136334 | A1 | 6/2006 | Atkinson et al. |
| 2006/0173985 | A1 | 8/2006 | Moore |
| 2006/0174331 | A1 | 8/2006 | Schuetz |
| 2006/0242698 | A1 | 10/2006 | Inskeep et al. |
| 2006/0280338 | A1 | 12/2006 | Rabb |
| 2007/0033642 | A1 | 2/2007 | Ganesan et al. |
| 2007/0055630 | A1 | 3/2007 | Gauthier et al. |
| 2007/0061266 | A1 | 3/2007 | Moore et al. |
| 2007/0061487 | A1 | 3/2007 | Moore et al. |
| 2007/0116292 | A1 | 5/2007 | Kurita et al. |
| 2007/0118745 | A1 | 5/2007 | Buer |
| 2007/0197261 | A1 | 8/2007 | Humbel |
| 2007/0198436 | A1 * | 8/2007 | Weiss .................. G06F 21/6245 |
| | | | 705/75 |
| 2007/0224969 | A1 | 9/2007 | Rao |
| 2007/0241182 | A1 | 10/2007 | Buer |
| 2007/0256134 | A1 | 11/2007 | Lehtonen et al. |
| 2007/0258594 | A1 | 11/2007 | Sandhu et al. |
| 2007/0276765 | A1 | 11/2007 | Hazel |
| 2007/0278291 | A1 | 12/2007 | Rans et al. |
| 2008/0008315 | A1 | 1/2008 | Fontana et al. |
| 2008/0011831 | A1 | 1/2008 | Bonalle et al. |
| 2008/0014867 | A1 | 1/2008 | Finn |
| 2008/0035738 | A1 | 2/2008 | Mullen |
| 2008/0071681 | A1 | 3/2008 | Khalid |
| 2008/0072303 | A1 | 3/2008 | Syed |
| 2008/0082452 | A1 | 4/2008 | Wankmueller |
| 2008/0086767 | A1 | 4/2008 | Kulkarni et al. |
| 2008/0099552 | A1 | 5/2008 | Grillion |
| 2008/0103968 | A1 | 5/2008 | Bies et al. |
| 2008/0109309 | A1 | 5/2008 | Landau et al. |
| 2008/0110983 | A1 | 5/2008 | Ashfield |
| 2008/0120711 | A1 | 5/2008 | Dispensa |
| 2008/0156873 | A1 | 7/2008 | Wilhelm et al. |
| 2008/0162312 | A1 | 7/2008 | Sklovsky et al. |
| 2008/0164308 | A1 | 7/2008 | Aaron et al. |
| 2008/0207307 | A1 | 8/2008 | Cunningham, II et al. |
| 2008/0209543 | A1 | 8/2008 | Aaron |
| 2008/0223918 | A1 | 9/2008 | Williams et al. |
| 2008/0285746 | A1 | 11/2008 | Landrock et al. |
| 2008/0308641 | A1 | 12/2008 | Finn |
| 2009/0037275 | A1 | 2/2009 | Pollio |
| 2009/0048026 | A1 | 2/2009 | French |
| 2009/0070155 | A1 * | 3/2009 | Zonnefeld .............. G06Q 50/12 |
| | | | 705/5 |
| 2009/0132417 | A1 | 5/2009 | Scipioni et al. |
| 2009/0143104 | A1 | 6/2009 | Loh et al. |
| 2009/0171682 | A1 | 7/2009 | Dixon et al. |
| 2009/0210308 | A1 | 8/2009 | Toomer et al. |
| 2009/0235339 | A1 | 9/2009 | Mennes et al. |
| 2009/0249077 | A1 | 10/2009 | Gargaro et al. |
| 2009/0282264 | A1 | 11/2009 | Ameil et al. |
| 2010/0023449 | A1 | 1/2010 | Skowronek et al. |
| 2010/0023455 | A1 | 1/2010 | Dispensa et al. |
| 2010/0029202 | A1 | 2/2010 | Jolivet et al. |
| 2010/0033310 | A1 | 2/2010 | Narendra et al. |
| 2010/0036769 | A1 | 2/2010 | Winters et al. |
| 2010/0078471 | A1 | 4/2010 | Lin et al. |
| 2010/0082491 | A1 | 4/2010 | Rosenblatt et al. |
| 2010/0094754 | A1 | 4/2010 | Bertran et al. |
| 2010/0095130 | A1 | 4/2010 | Bertran et al. |
| 2010/0100480 | A1 | 4/2010 | Altman et al. |
| 2010/0114731 | A1 | 5/2010 | Kingston et al. |
| 2010/0192230 | A1 | 7/2010 | Steeves et al. |
| 2010/0207742 | A1 | 8/2010 | Buhot et al. |
| 2010/0211797 | A1 | 8/2010 | Westerveld et al. |
| 2010/0240413 | A1 | 9/2010 | He et al. |
| 2010/0257357 | A1 | 10/2010 | McClain |
| 2010/0312634 | A1 | 12/2010 | Cervenka |
| 2010/0312635 | A1 | 12/2010 | Cervenka |
| 2011/0028160 | A1 | 2/2011 | Roeding et al. |
| 2011/0035604 | A1 | 2/2011 | Habraken |
| 2011/0060631 | A1 | 3/2011 | Grossman et al. |
| 2011/0068170 | A1 | 3/2011 | Lehman |
| 2011/0084132 | A1 | 4/2011 | Tofighbakhsh |
| 2011/0101093 | A1 | 5/2011 | Ehrensvard |
| 2011/0113245 | A1 | 5/2011 | Varadarajan |
| 2011/0125638 | A1 | 5/2011 | Davis et al. |

(56) References Cited

U.S. PATENT DOCUMENTS

| | | |
|---|---|---|
| 2011/0131415 A1 | 6/2011 | Schneider |
| 2011/0153437 A1 | 6/2011 | Archer et al. |
| 2011/0153496 A1 | 6/2011 | Royyuru |
| 2011/0155801 A1 | 6/2011 | Rowberry |
| 2011/0208658 A1 | 8/2011 | Makhotin |
| 2011/0208965 A1 | 8/2011 | Machani |
| 2011/0211219 A1 | 9/2011 | Bradley et al. |
| 2011/0218911 A1 | 9/2011 | Spodak |
| 2011/0238564 A1 | 9/2011 | Lim et al. |
| 2011/0246780 A1 | 10/2011 | Yeap et al. |
| 2011/0258452 A1 | 10/2011 | Coulier et al. |
| 2011/0280406 A1 | 11/2011 | Ma et al. |
| 2011/0282785 A1 | 11/2011 | Chin |
| 2011/0294418 A1 | 12/2011 | Chen |
| 2011/0312271 A1 | 12/2011 | Ma et al. |
| 2012/0024947 A1 | 2/2012 | Naelon |
| 2012/0030047 A1 | 2/2012 | Fuentes et al. |
| 2012/0030121 A1 | 2/2012 | Grellier |
| 2012/0047071 A1 | 2/2012 | Mullen et al. |
| 2012/0079281 A1 | 3/2012 | Lowenstein et al. |
| 2012/0109735 A1 | 5/2012 | Krawczewicz et al. |
| 2012/0109764 A1 | 5/2012 | Martin et al. |
| 2012/0143703 A1 | 6/2012 | Wall |
| 2012/0143754 A1 | 6/2012 | Patel |
| 2012/0150737 A1 | 6/2012 | Rottink et al. |
| 2012/0178366 A1 | 7/2012 | Levy et al. |
| 2012/0196583 A1 | 8/2012 | Kindo |
| 2012/0207305 A1 | 8/2012 | Gallo et al. |
| 2012/0209773 A1 | 8/2012 | Ranganathan |
| 2012/0238206 A1 | 9/2012 | Singh et al. |
| 2012/0239560 A1 | 9/2012 | Pourfallah et al. |
| 2012/0252350 A1 | 10/2012 | Steinmetz et al. |
| 2012/0254394 A1 | 10/2012 | Barras |
| 2012/0284194 A1 | 11/2012 | Liu et al. |
| 2012/0290472 A1 | 11/2012 | Mullen et al. |
| 2012/0296818 A1 | 11/2012 | Nuzzi et al. |
| 2012/0316992 A1 | 12/2012 | Oborne |
| 2012/0317035 A1 | 12/2012 | Royyuru et al. |
| 2012/0317628 A1 | 12/2012 | Yeager |
| 2013/0005245 A1 | 1/2013 | Royston |
| 2013/0008956 A1 | 1/2013 | Ashfield |
| 2013/0026229 A1 | 1/2013 | Jarman et al. |
| 2013/0030997 A1 | 1/2013 | Spodak |
| 2013/0048713 A1 | 2/2013 | Pan |
| 2013/0054474 A1 | 2/2013 | Yeager |
| 2013/0065564 A1 | 3/2013 | Conner et al. |
| 2013/0080228 A1 | 3/2013 | Fisher |
| 2013/0080229 A1 | 3/2013 | Fisher |
| 2013/0099587 A1 | 4/2013 | Lou et al. |
| 2013/0104251 A1 | 4/2013 | Moore et al. |
| 2013/0106576 A1 | 5/2013 | Hinman et al. |
| 2013/0119130 A1 | 5/2013 | Braams |
| 2013/0130614 A1 | 5/2013 | Busch-Sorensen |
| 2013/0144793 A1 | 6/2013 | Royston |
| 2013/0146657 A1 | 6/2013 | Graef |
| 2013/0171929 A1 | 7/2013 | Adams et al. |
| 2013/0179351 A1 | 7/2013 | Wallner |
| 2013/0185772 A1 | 7/2013 | Jaudon et al. |
| 2013/0191279 A1 | 7/2013 | Calman et al. |
| 2013/0200999 A1 | 8/2013 | Spodak et al. |
| 2013/0211937 A1 | 8/2013 | Elbirt |
| 2013/0216108 A1 | 8/2013 | Hwang et al. |
| 2013/0226791 A1 | 8/2013 | Springer et al. |
| 2013/0226796 A1 | 8/2013 | Jiang et al. |
| 2013/0232082 A1 | 9/2013 | Krawczewicz et al. |
| 2013/0238894 A1 | 9/2013 | Ferg et al. |
| 2013/0282360 A1 | 10/2013 | Shimota et al. |
| 2013/0303085 A1 | 11/2013 | Boucher et al. |
| 2013/0304651 A1 | 11/2013 | Smith |
| 2013/0311363 A1 | 11/2013 | Ramaci |
| 2013/0312082 A1 | 11/2013 | Izu et al. |
| 2013/0314593 A1 | 11/2013 | Reznik et al. |
| 2013/0344857 A1 | 12/2013 | Berionne et al. |
| 2014/0002238 A1 | 1/2014 | Taveau et al. |
| 2014/0019352 A1 | 1/2014 | Shrivastava |
| 2014/0027506 A1 | 1/2014 | Heo et al. |
| 2014/0032409 A1 | 1/2014 | Rosano |
| 2014/0032410 A1 | 1/2014 | Georgiev et al. |
| 2014/0040120 A1 | 2/2014 | Cho et al. |
| 2014/0040139 A1 | 2/2014 | Brudnicki et al. |
| 2014/0040147 A1 | 2/2014 | Varadarakan et al. |
| 2014/0047235 A1 | 2/2014 | Lessiak et al. |
| 2014/0067690 A1 | 3/2014 | Pitroda et al. |
| 2014/0074637 A1 | 3/2014 | Hammad |
| 2014/0074655 A1 | 3/2014 | Lim et al. |
| 2014/0081720 A1 | 3/2014 | Wu |
| 2014/0081785 A1 | 3/2014 | Valadas Preto |
| 2014/0138435 A1 | 5/2014 | Khalid |
| 2014/0171034 A1 | 6/2014 | Aleksin et al. |
| 2014/0171039 A1 | 6/2014 | Bjontegard |
| 2014/0172700 A1 | 6/2014 | Teuwen et al. |
| 2014/0180851 A1 | 6/2014 | Fisher |
| 2014/0208112 A1 | 7/2014 | McDonald et al. |
| 2014/0214674 A1 | 7/2014 | Narula |
| 2014/0229375 A1 | 8/2014 | Zaytzsev et al. |
| 2014/0245391 A1 | 8/2014 | Adenuga |
| 2014/0256251 A1 | 9/2014 | Caceres et al. |
| 2014/0258099 A1 | 9/2014 | Rosano |
| 2014/0258113 A1 | 9/2014 | Gauthier et al. |
| 2014/0258125 A1 | 9/2014 | Gerber et al. |
| 2014/0274179 A1 | 9/2014 | Zhu et al. |
| 2014/0279479 A1 | 9/2014 | Maniar et al. |
| 2014/0328250 A1* | 11/2014 | Hardy ................... H04W 12/08 |
| | | 370/328 |
| 2014/0337235 A1 | 11/2014 | Van Heerden et al. |
| 2014/0339315 A1 | 11/2014 | Ko |
| 2014/0346860 A1 | 11/2014 | Aubry et al. |
| 2014/0365377 A1 | 12/2014 | Salama |
| 2014/0365780 A1 | 12/2014 | Movassaghi |
| 2014/0379361 A1 | 12/2014 | Mahadkar et al. |
| 2015/0012444 A1 | 1/2015 | Brown et al. |
| 2015/0032635 A1 | 1/2015 | Guise |
| 2015/0071486 A1 | 3/2015 | Rhoads et al. |
| 2015/0073983 A1 | 3/2015 | Bartenstein |
| 2015/0088757 A1 | 3/2015 | Zhou et al. |
| 2015/0089586 A1 | 3/2015 | Ballesteros |
| 2015/0113271 A1 | 4/2015 | Jooste |
| 2015/0134452 A1 | 5/2015 | Williams |
| 2015/0134513 A1 | 5/2015 | Olson |
| 2015/0140960 A1 | 5/2015 | Powell et al. |
| 2015/0154595 A1 | 6/2015 | Collinge et al. |
| 2015/0170138 A1 | 6/2015 | Rao |
| 2015/0178724 A1 | 6/2015 | Ngo et al. |
| 2015/0186871 A1 | 7/2015 | Laracey |
| 2015/0199673 A1 | 7/2015 | Savolainen |
| 2015/0199863 A1 | 7/2015 | Scoggins |
| 2015/0205379 A1 | 7/2015 | Mag et al. |
| 2015/0254637 A1 | 9/2015 | Yang |
| 2015/0302409 A1 | 10/2015 | Malek et al. |
| 2015/0317295 A1 | 11/2015 | Sherry |
| 2015/0317626 A1 | 11/2015 | Ran et al. |
| 2015/0317630 A1* | 11/2015 | Piel ....................... G06Q 20/36 |
| | | 705/44 |
| 2015/0332266 A1 | 11/2015 | Friedlander et al. |
| 2015/0339474 A1 | 11/2015 | Paz et al. |
| 2015/0371234 A1 | 12/2015 | Huang et al. |
| 2016/0012465 A1 | 1/2016 | Sharp |
| 2016/0026997 A1 | 1/2016 | Tsui et al. |
| 2016/0048913 A1 | 2/2016 | Rausaria et al. |
| 2016/0055480 A1 | 2/2016 | Shah |
| 2016/0057619 A1 | 2/2016 | Lopez |
| 2016/0065370 A1 | 3/2016 | Le Saint et al. |
| 2016/0078430 A1 | 3/2016 | Douglas |
| 2016/0087957 A1 | 3/2016 | Shah et al. |
| 2016/0092696 A1 | 3/2016 | Guglani et al. |
| 2016/0148193 A1 | 5/2016 | Kelley et al. |
| 2016/0189143 A1 | 6/2016 | Koeppel |
| 2016/0232523 A1 | 8/2016 | Venot et al. |
| 2016/0239672 A1 | 8/2016 | Khan et al. |
| 2016/0253651 A1 | 9/2016 | Park et al. |
| 2016/0255072 A1 | 9/2016 | Liu |
| 2016/0267486 A1 | 9/2016 | Mitra et al. |
| 2016/0277383 A1 | 9/2016 | Guyomarc'h et al. |
| 2016/0277388 A1 | 9/2016 | Lowe et al. |

(56) References Cited

U.S. PATENT DOCUMENTS

| | | |
|---|---|---|
| 2016/0307187 A1 | 10/2016 | Guo et al. |
| 2016/0307189 A1 | 10/2016 | Zarakas et al. |
| 2016/0314472 A1 | 10/2016 | Ashfield |
| 2016/0330027 A1 | 11/2016 | Ebrahimi |
| 2016/0335531 A1 | 11/2016 | Mullen et al. |
| 2016/0379217 A1 | 12/2016 | Hammad |
| 2017/0004502 A1 | 1/2017 | Quentin et al. |
| 2017/0011395 A1 | 1/2017 | Pillai et al. |
| 2017/0011406 A1 | 1/2017 | Tunnell et al. |
| 2017/0017957 A1 | 1/2017 | Radu |
| 2017/0017964 A1 | 1/2017 | Janefalkar et al. |
| 2017/0024716 A1 | 1/2017 | Jiam et al. |
| 2017/0039566 A1 | 2/2017 | Schipperheijn |
| 2017/0041759 A1 | 2/2017 | Gantert et al. |
| 2017/0068950 A1 | 3/2017 | Kwon |
| 2017/0103388 A1 | 4/2017 | Pillai et al. |
| 2017/0104739 A1 | 4/2017 | Lansler et al. |
| 2017/0109509 A1 | 4/2017 | Baghdasaryan |
| 2017/0109730 A1 | 4/2017 | Locke et al. |
| 2017/0116447 A1 | 4/2017 | Cimino et al. |
| 2017/0124568 A1 | 5/2017 | Moghadam |
| 2017/0140379 A1 | 5/2017 | Deck |
| 2017/0154328 A1 | 6/2017 | Zarakas et al. |
| 2017/0154333 A1 | 6/2017 | Gleeson et al. |
| 2017/0180134 A1 | 6/2017 | King |
| 2017/0193595 A1* | 7/2017 | Lopez ............... G06Q 30/0645 |
| 2017/0230189 A1 | 8/2017 | Toll et al. |
| 2017/0237301 A1 | 8/2017 | Elad et al. |
| 2017/0289127 A1 | 10/2017 | Hendrick |
| 2017/0295013 A1 | 10/2017 | Claes |
| 2017/0316696 A1 | 11/2017 | Bartel |
| 2017/0317834 A1 | 11/2017 | Smith et al. |
| 2017/0330173 A1 | 11/2017 | Woo et al. |
| 2017/0374070 A1 | 12/2017 | Shah et al. |
| 2018/0034507 A1 | 2/2018 | Wobak et al. |
| 2018/0039986 A1 | 2/2018 | Essebag et al. |
| 2018/0039987 A1 | 2/2018 | Molino |
| 2018/0068316 A1 | 3/2018 | Essebag et al. |
| 2018/0129945 A1 | 5/2018 | Saxena et al. |
| 2018/0160255 A1 | 6/2018 | Park |
| 2018/0191501 A1 | 7/2018 | Lindemann |
| 2018/0205712 A1 | 7/2018 | Versteeg et al. |
| 2018/0240106 A1 | 8/2018 | Garrett et al. |
| 2018/0254909 A1 | 9/2018 | Hancock |
| 2018/0268132 A1 | 9/2018 | Buer et al. |
| 2018/0270214 A1 | 9/2018 | Caterino et al. |
| 2018/0294959 A1 | 10/2018 | Traynor et al. |
| 2018/0300716 A1 | 10/2018 | Carlson |
| 2018/0302396 A1 | 10/2018 | Camenisch et al. |
| 2018/0315050 A1 | 11/2018 | Hammad |
| 2018/0316666 A1 | 11/2018 | Koved et al. |
| 2018/0322486 A1 | 11/2018 | Deliwala et al. |
| 2018/0359100 A1 | 12/2018 | Gaddam et al. |
| 2019/0014107 A1 | 1/2019 | George |
| 2019/0019375 A1 | 1/2019 | Foley |
| 2019/0036678 A1 | 1/2019 | Ahmed |
| 2019/0172055 A1 | 6/2019 | Hale |
| 2019/0238517 A1 | 8/2019 | D'Agostino et al. |
| 2019/0303945 A1 | 10/2019 | Mitra |
| 2020/0104826 A1* | 4/2020 | Rule ................. G06Q 20/3552 |
| 2020/0126058 A1 | 4/2020 | Mars et al. |
| 2020/0234295 A1* | 7/2020 | Newman .............. H04L 9/0861 |
| 2020/0302426 A1 | 9/2020 | Lu et al. |
| 2020/0302436 A1 | 9/2020 | Ilincic et al. |
| 2021/0004806 A1 | 1/2021 | Noe |
| 2021/0201297 A1 | 7/2021 | Chen |
| 2021/0272098 A1 | 9/2021 | Delsuc |
| 2021/0304189 A1 | 9/2021 | Gupta |
| 2021/0383360 A1 | 12/2021 | Sinha |
| 2021/0406869 A1 | 12/2021 | Pathrabe |
| 2022/0114581 A1 | 4/2022 | Upadhye |
| 2022/0284416 A1 | 9/2022 | Rule |
| 2022/0292411 A1* | 9/2022 | Choi ...................... G07F 17/10 |
| 2022/0309509 A1 | 9/2022 | Akgun |
| 2022/0335412 A1 | 10/2022 | Rule |
| 2022/0366410 A1 | 11/2022 | Rule |
| 2022/0398566 A1 | 12/2022 | Rule |
| 2022/0414648 A1 | 12/2022 | Rule |
| 2023/0054157 A1 | 2/2023 | Mao |
| 2023/0065163 A1 | 3/2023 | Vargas |
| 2023/0083785 A1 | 3/2023 | Maiman |
| 2023/0169505 A1 | 6/2023 | Rule |
| 2023/0354020 A1 | 11/2023 | Rule |
| 2023/0359839 A1 | 11/2023 | Lovgren |

FOREIGN PATENT DOCUMENTS

| | | | |
|---|---|---|---|
| CN | 103023643 A | | 4/2013 |
| CN | 103417202 A | | 12/2013 |
| EP | 1085424 A1 | | 3/2001 |
| EP | 1223565 A1 | | 7/2002 |
| EP | 1265186 A2 | | 12/2002 |
| EP | 1783919 A1 | | 5/2007 |
| EP | 2139196 A1 | | 12/2009 |
| EP | 1469419 A1 | | 8/2012 |
| EP | 2852070 A1 | | 3/2015 |
| GB | 2457221 A | | 8/2009 |
| GB | 2516861 A | | 2/2015 |
| GB | 2551907 A | | 1/2018 |
| KR | 101508320 B1 | | 4/2015 |
| KR | 20150140132 A | | 12/2015 |
| WO | 9910824 A1 | | 3/1999 |
| WO | 0049586 A1 | | 8/2000 |
| WO | 2006070189 A2 | | 7/2006 |
| WO | 2008055170 A2 | | 5/2008 |
| WO | 2009025605 A2 | | 2/2009 |
| WO | 2010049252 A1 | | 5/2010 |
| WO | 2011112158 A1 | | 9/2011 |
| WO | 2012001624 A1 | | 1/2012 |
| WO | 2013039395 A1 | | 3/2013 |
| WO | 2013155562 A1 | | 10/2013 |
| WO | 2013192358 A2 | | 12/2013 |
| WO | 2014043278 A1 | | 3/2014 |
| WO | 2014170741 A2 | | 10/2014 |
| WO | 2015179649 A1 | | 11/2015 |
| WO | 2015183818 A1 | | 12/2015 |
| WO | 2016097718 A1 | | 6/2016 |
| WO | 2016160816 A1 | | 10/2016 |
| WO | 2016168394 A1 | | 10/2016 |
| WO | 2017042375 A1 | | 3/2017 |
| WO | 2017042400 A1 | | 3/2017 |
| WO | 2017047855 A1 | | 3/2017 |
| WO | 2017157859 A1 | | 9/2017 |
| WO | 2017208063 A1 | | 12/2017 |
| WO | 2018063809 A1 | | 4/2018 |
| WO | 2018137888 A1 | | 8/2018 |
| WO | WO-2018228252 A1 * | | 12/2018 |
| WO | 2019022585 A1 | | 1/2019 |
| WO | 2021051884 A1 | | 3/2021 |
| WO | 2021133492 A1 | | 7/2021 |
| WO | 2022108959 A1 | | 5/2022 |
| WO | 2022187350 A1 | | 9/2022 |
| WO | 2023017943 A1 | | 2/2023 |
| WO | 2023064063 A1 | | 4/2023 |

OTHER PUBLICATIONS

Haykin, M. and Warnar, R., "Smart Card Technology: New Methods for Computer Access Control", Computer Science and Technology NIST Special Publication 500-157:1-60 (1988).

Ehpamer, H., "Component of the RFID System", RFID Design Principles, 2nd edition pp. 133-201 (2012).

Author Unknown, "CardrefresherSM from American Express®", [online] 2019 [retrieved on Mar. 25, 2019]. Retrieved from Internet URL: https://merchant-channel.americanexpress.com/merchant/en_US/cardrefresher, 2 pages.

Author Unknown, "Add Account Updater to your recurring payment tool", [online] 2018-19 [retrieved on Mar. 25, 2019]. Retrieved from Internet URL: https://www.authorize.net/our-features/account-updater/, 5 pages.

Author Unknown, "Visa® Account Updater for Merchants", [online] 2019 [retrieved on Mar. 25, 2019]. Retrieved from Internet URL:

(56) References Cited

OTHER PUBLICATIONS https://usa.visa.com/dam/VCOM/download/merchants/visa-account-updater-product-information-fact-sheet-for-merchants.pdf, 2 pages.

Author Unknown, "Manage the cards that you use with Apple Pay", Apple Support [online] 2019 [retrieved on Mar. 25, 2019]. Retrieved from Internet URL: https://support.apple.com/en-us/HT205583, 5 pages.

Author Unknown, "Contactless Specifications for Payment Systems", EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.

Author Unknown, "EMV Integrated Circuit Card Specifcations for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.

Author Unknown, "NFC Guide: All You Need to Know About Near Field Communication", Square Guide [online] 2018 [retrieved on Nov. 13, 2018]. Retrieved from Internet URL: https://squareup.com/guides/nfc, 8 pages.

Profis, S., "Everything you need to know about NFC and mobile payments" CNET Directory [online], 2014 [retrieved on Mar. 25, 2019]. Retrieved from the Internet URL: https://www.cnet.com/how-to/how-nfc-works-and-mobile-payments/, 6 pages.

Cozma, N., "Copy data from other devices in Android 5.0 Lollipop setup", CNET Directory [online] 2014 [retrieved on Mar. 25, 2019]. Retrieved from the Internet URL: https://www.cnet.com/how-to/copy-data-from-other-devices-in-android-5-0-lollipop-setup/, 5 pages.

Kevin, Android Enthusiast, "How to copy text string from nfc tag", StackExchange [online] 2013 [retrieved on Mar. 25, 2019]. Retrieved from the Internet URL: https://android.stackexchange.com/questions/55689/how-to-copy-text-string-from-nfc-tag, 11 pages.

Author Unknown, "Tap & Go Device Setup", Samsung [online] date unknown [retrieved on Mar. 25, 2019]. Retrieved from the Internet URL: https://www.samsung.com/us/switch-me/switch-to-the-galaxy-s-5/app/partial/setup-device/tap-go.html, 1 page.

Author Unknown, "Multiple encryption", Wikipedia [online] 2019 [retrieved on Mar. 25, 2019]. Retrieved from Internet URL: https://en.wikipedia.org/wiki/Multiple_encryption, 4 pages.

Krawczyk, et al., "HMAC: Keyed-Hashing for Message Authentication", Network Working Group RFC:2104 memo [online] 1997 [retrieved on Mar. 25, 2019]. Retrieved from Internet URL: https://tools.ietf.org/html/rfc2104, 12 pages.

Song, et al., "The AES-CMAC Algorithm", Network Working Group RFC: 4493 memo [online] 2006 [retrieved on Mar. 25, 2019]. Retrieved from Internet URL: https://tools.ietf.org/html/rfc4493, 21 pages.

Katz, J. and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.

Adams, D., and Maier, A-K., "Goldbug Big Seven open source crypto-messengers to be compared—or: Comprehensive Confidentiality Review & Audit of GoldBug Encrypting E-Mail-Client & Secure Instant Messenger", Big Seven Study 2016 [online] [retrieved on Mar. 25, 2018]. Retrieved from Internet URL: https://sf.net/projects/goldbug/files/bigseven-crypto-audit.pdf, 309 pages.

Author Unknown, "Triple DES", Wikipedia [online] 2018 [retrieved on Mar. 25, 2019]. Retrieved from Internet URL: https://simple.wikipedia.org/wiki/Triple_DES, 2 pages.

Song F., and Yun, A.I., "Quantum Security of NMAC and Related Constructions—PRF domain extension against quantum attacks", IACR Cryptology ePrint Archive [online] 2017 [retrieved on Mar. 25, 2019]. Retrieved from Internet URL: https://eprint.iacr.org/2017/509.pdf, 41 pages.

Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture 10.pdf, 8 pages.

Berg, G., "Fundamentals of EMV", Smart Card Alliance [online] date unknown [retrieved on Mar. 27, 2019]. Retrieveed from Internet URL: https://www.securetechalliance.org/resources/media/scap13_preconference/02.pdf, 37 pages.

Pierce, K., "Is the amazon echo nfc compatible?", Amazon.com Customer Q&A [online] 2016 [retrieved on Mar. 26, 2019]. Retrieved from Internet URL: https://www.amazon.com/ask/questions/Tx1RJXYSPE6XLJD?_encodi . . . , 2 pages.

Author Unknown, "Multi-Factor Authentication", idaptive [online] 2019 [retrieved on Mar. 25, 2019]. Retrieved from Internet URL: https://www.centrify.com/products/application-services/adaptive-multi-factor-authentication/risk-based-mfa/, 10 pages.

Author Unknown, "Adaptive Authentication", SecureAuth [online] 2019 [retrieved on Mar. 25, 2019}. Retrieved from Internet URL: https://www.secureauth.com/products/access-management/adaptive-authentication, 7 pages.

Van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.

Author Unknown, "Autofill", Computer Hope [online] 2018 [retrieved on Mar. 25, 2019]. Retrieved from Internet URL: https://www.computerhope.com/jargon/a/autofill.htm, 2 pages.

Author Unknown, "Fill out forms automatically", Google Chrome Help [online] 2019 [retrieved on Mar. 25, 2019]. Retrieved from Internet URL: https://support.google.com/chrome/answer/142893?co=GENIE.Platform%3DDesktop&hl=en, 3 pages.

Author Unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.

Menghin, M.J., "Power Optimization Techniques for Near Field Communication Systems", 2014 Dissertation at Technical University of Graz [online]. Retrieved from Internet URL: https://diglib.tugraz.at/download.php?id=576a7b910d2d6&location=browse, 135 pages.

Mareli, M., et al., "Experimental evaluation of NFC reliability between an RFID tag and a smartphone", Conference paper (2013) IEEE Africon At Mauritius [online] [retrieved on Mar. 25, 2019]. Retrieved from Internet URL: https://core.ac.uk/download/pdf/54204839.pdf, 5 pages.

Davison, A., et al., "MonoSLAM: Real-Time Single Camera SLAM", IEEE Transactions on Pattern Analysis and Machine Intelligence 29(6): 1052-1067 (2007).

Barba, R., "Sharing your location with your bank sounds creepy, but it's also useful", Bankrate, LLC [online] 2017 [retrieved on Mar. 25, 2019]. Retrieved from Internet URL: https://www.bankrate.com/banking/banking-app-location-sharing/, 6 pages.

Author Unknown: "onetappayment™", [online] Jan. 24, 2019, [retrieved on Mar. 25, 2019]. Retrieved from Internet URL: https://www.payubiz.in/onetap, 4 pages.

Vu, et al., "Distinguishing users with capacitive touch communication", Proceedings of the Annual International Conference on Mobile Computing and Networking, 2012, MOBICOM. 10.1145/2348543.2348569.

Pourghomi, P., et al., "A Proposed NFC Payment Application," International Journal of Advanced Computer Science and Applications, 4(8):173-181 (2013).

Author unknown, "EMV Card Personalization Specification", EMVCo., LLC., specification version 1.0, (2003) 81 pages.

Ullmann et al., "On-Card" User Authentication for Contactless Smart Cards based on Gesture Recognition, paper presentation LNI proceedings, (2012) 12 pages.

Faraj, S.T., et al., "Investigation of Java Smart Card Technology for Multi-Task Applications", J of Al-Anbar University for Pure Science, 2(1):23 pages (2008).

Dhamdhere, P., "Key Benefits of a Unified Platform for Loyalty, Referral Marketing, and UGC" Annex Cloud [online] May 19, 2017 [retrieved on Jul. 3, 2019]. Retrieved from Internet URL: https://www.annexcloude.com/blog/benefits-unified-platform/, 13 pages.

International Search Report and Written Opinion dated Nov. 15, 2022, for Application No. PCT/US2022/040144 (11 pages).

(56) References Cited

OTHER PUBLICATIONS

Author Unknown, "Global expansion of card tapping mobile OTP for security and convenience is imminent," Jun. 28, 2022, website: https://www.swidch.com/blogs/card-tapping-motp-blog.

Emvco: "EMV Card Personalisation Specification", Aug. 1, 2021, pp. 1-114, Retrieved from the Internet: URL: https://www.emvco.com/specification/?post_id=12467.

Saush, "Getting information from an EMV chip card with Java," Sep. 8, 2006, WordPress, pp. 1-13.

Smart Card Alliance, "Co-Branded Multi-Application Contactless Cards for Transit and Financial Payment," A Smart Card Alliance Transportation Council White Paper (40 pages), Mar. 2008.

* cited by examiner

COMPUTING DEVICE 106

COMPUTING DEVICE 106

400

RECEIVE ENCRYPTED DATA GENERATED BY A CONTACTLESS CARD CORRESPONDING TO A RENTAL OF AN ITEM <u>402</u>

↓

EXTRACT AUTHENTICATION INFORMATION FROM THE ENCRYPTED DATA <u>404</u>

↓

PERFORM AN AUTHENTICATION OPERATION ON THE AUTHENTICATION INFORMATION TO AUTHENTICATE THE CONTACTLESS CARD <u>406</u>

↓

SEND A RESULT OF THE AUTHENTICATION OPERATION INDICATING THAT THE CONTACTLESS CARD IS AUTHENTIC <u>408</u>

↓

RECEIVE A PAYMENT REQUEST TO PAY FOR THE RENTAL OF THE ITEM <u>410</u>

↓

PROCESS THE PAYMENT REQUEST BASED ON INFORMATION IN THE ENCRYPTED DATA <u>412</u>

↓

SEND A SECOND RESULT OF THE PROCESSING OF THE PAYMENT REQUEST INDICATING THAT PAYMENT IS SUCCESSFUL FOR THE RENTAL OF THE ITEM <u>414</u>

FIG. 4

RECEIVE ENCRYPTED DATA STORED ON A CONTACTLESS CARD AND RENTAL DATA CORRESPONDING TO A RENTAL OF AN ITEM 502

SEND THE ENCRYPTED DATA TO ONE OR MORE SERVERS TO PERFORM AN AUTHENTICATION OPERATION WITH THE ENCRYPTED DATA 504

RECEIVE A RESULT OF THE AUTHENTICATION ROUTINE INDICATING THE CONTACTLESS CARD IS AUTHENTIC 506

IN RESPONSE TO AUTHENTICATION OF THE USER, PERFORM ONE OR MORE OPERATIONS TO ENABLE THE RENTAL OF THE ITEM 508

FIG. 5

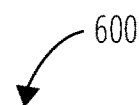
600

DETECT A CONTACTLESS CARD WITHIN A NEAR-FIELD COMMUNICATION (NFC) RANGE 602

RECEIVING ENCRYPTED DATA FROM THE CONTACTLESS CARD, THE ENCRYPTED DATA COMPRISING AUTHENTICATION INFORMATION TO AUTHENTICATE A USER 604

SEND THE ENCRYPTED DATA AND RENTAL DATA, THE RENTAL DATA CORRESPONDING TO A RENTAL OF AN ITEM 606

RECEIVE AN INDICATION TO ENABLE THE RENTAL OF THE ITEM 608

CAUSE AN ACTION TO PERMIT THE RENTAL OF THE ITEM BASED ON THE INDICATION 610

FIG. 6

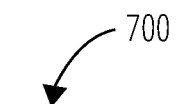
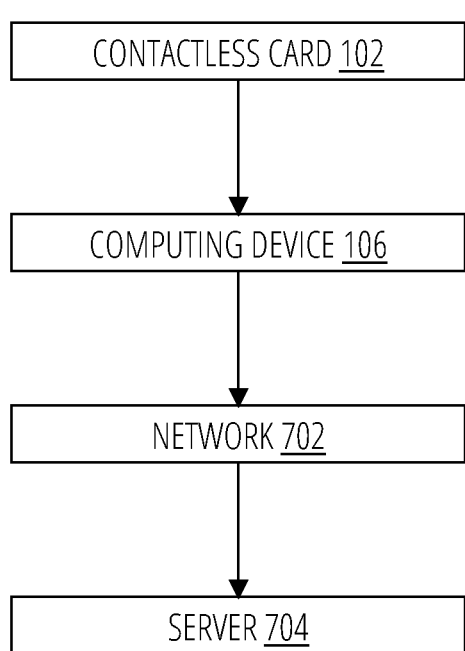
FIG. 7

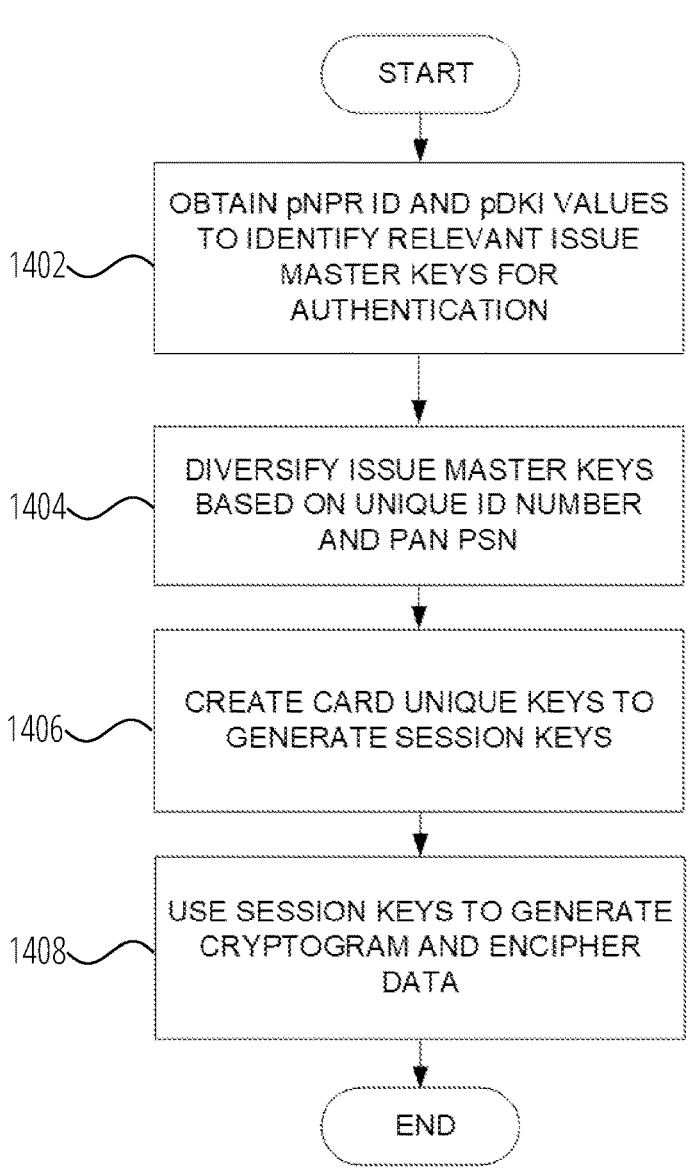
START
OBTAIN pNPR ID AND pDKI VALUES TO IDENTIFY RELEVANT ISSUE MASTER KEYS FOR AUTHENTICATION
1402
DIVERSIFY ISSUE MASTER KEYS BASED ON UNIQUE ID NUMBER AND PAN PSN
1404
CREATE CARD UNIQUE KEYS TO GENERATE SESSION KEYS
1406
USE SESSION KEYS TO GENERATE CRYPTOGRAM AND ENCIPHER DATA
1408
END
FIG. 14

FIG.17

| Message Format | | | | |
|---|---|---|---|---|
| 1 | 2 | 4 | 8 | 8 |
| 0x43 (Message Type 'A') | Version | pATC | RND | Cryptogram A (MAC) |

| Cryptogram A (MAC) | 8 bytes | |
|---|---|---|
| MAC of | | |

| 2 | 8 | 4 | 4 | 18 bytes input data |
|---|---|---|---|---|
| Version | pUID | pATC | Shared Secret | |

| Message Format | | | |
|---|---|---|---|
| 1 | 2 | 4 | 16 |
| 0x43 (Message Type 'A') | Version | pATC | Cryptogram B |

| Cryptogram A (MAC) | 8 bytes | |
|---|---|---|
| MAC of | | |

| 2 | 8 | 4 | 4 | 18 bytes input data |
|---|---|---|---|---|
| Version | pUID | pATC | Shared Secret | |

| | | | |
|---|---|---|---|
| Cryptogram B | 16 | | |
| Sym Encryption of | | | |
| 8 | 8 | | |
| RND | Cryptogram A | | |

FIG.18

| Message Format | | | | | |
|---|---|---|---|---|---|
| 2 | 8 | 4 | | 8 | 8 |
| Version | pUID | pATC | | RND | Cryptogram A (MAC) |
| | | | | | |
| 8 bytes | | | | | |
| 8 | 8 | 4 | 4 | 18 bytes input data | |
| pUID | pUID | pATC | Shared Secret | | |

| Message Format | | | |
|---|---|---|---|
| 2 | 8 | 4 | 16 |
| Version | pUID | pATC | Cryptogram B |
| | | | |
| 8 bytes | | | |
| | | | |
| 8 | | 4 | 4 | 18 bytes input data |
| pUID | pUID | pATC | Shared Secret | |
| | | | |
| Cryptogram B | 16 | | |
| Sym Encryption of | | | |
| 8 | 8 | | |
| RND | Cryptogram A | | |

TECHNIQUES AND SYSTEMS TO PERFORM AUTHENTICATION AND PAYMENT OPERATIONS WITH A CONTACTLESS CARD TO PROVIDE ITEMS AND SERVICES

BACKGROUND

More and more of today's activities are being automated, including performing tasks such as renting items like scooters, vehicles, and other equipment. For example, many cities have fleets of scooters deployed throughout that city. These scooters are available for rent without interacting with a person. However, the process is quite cumbersome and high friction, especially for the first rental. A user may be required to perform several tasks, including downloading a specific application associated with the scooter to a mobile device. The user may then be required to set up an account with the scooter company to use the application to rent scooters. During the actual rental process, the user may be further required to identify the scooter for rent, login/access their account, confirm payment, and go through several additional steps to rent the scooter. Embodiments discussed herein aim to simplify this process securely.

BRIEF SUMMARY

Embodiments discussed herein are generally directed to systems, devices, methods, and techniques to perform authentication and payment operations with a contactless card to provide items and services. For example, embodiments may include a system configured to perform authentication and payment operations based on data stored in contactless cards. The system can include one or more servers comprising one or more processors and memory, the memory coupled with the one or more processors and configured to store instructions. The instructions, that when executed by the one or more processors, cause the one or more processors to receive, from a rental system, encrypted data generated by a contactless card corresponding to a rental of an item, extract authentication information from the encrypted data, perform an authentication operation on the authentication information to authenticate the contactless card, send, to the rental system, a result of the authentication operation indicating that the contactless card is authentic, receive, from the rental system, a payment request to pay for the rental of the item in response to the contactless card being authentic, process the payment request based on information in the encrypted data, and send, to the rental system, a second result of the processing of the payment request indicating that payment is successful for the rental of the item.

In another example, embodiments may include a server configured to enable rental of items based on authentication operations performed with data stored in contactless cards. The server may include one or more processors, and memory coupled with the one or more processors, the memory to store instructions. The instructions, that when executed by the one or more processors, cause the one or more processors to receive and process, from a computing device, encrypted data stored on a contactless card and rental data corresponding to a rental of an item, send the encrypted data to one or more servers to perform an authentication operation with the encrypted data, receive, from the one or more servers, a result of the authentication operation indicating the contactless card is authentic, and in response to authentication of the contactless card, a user, or a combination thereof, perform one or more operations to enable the rental of the item.

In another example, embodiments may include computing device, comprising processing circuitry, and memory coupled with the processing circuitry, the memory to store instructions. The instructions that when executed by the processing circuitry, cause the processing circuitry to detect a contactless card within a near-field communication (NFC) range, receive, via one or more NFC exchanges, encrypted data from the contactless card, the encrypted data comprising authentication information to authenticate a user, send, to one or more servers, the encrypted data and rental data, the rental data corresponding to a rental of an item, receive, from the one or more servers, an indication to enable the rental of the item, and cause an action to permit the rental of the item based on the indication.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 4 illustrates a routine 400 in accordance with embodiments.

FIG. 5 illustrates a routine 500 in accordance with embodiments.

FIG. 6 illustrates a routine 600 in accordance with embodiments.

FIG. 7 illustrates an example of a system 700 in accordance with embodiments.

FIG. 14 is a flowchart of a method of generating a cryptogram according to an example embodiment.

FIG. 17 illustrates an embodiment of message formats.

FIG. 18 illustrates another embodiment of message formats.

DETAILED DESCRIPTION

Figure 1:
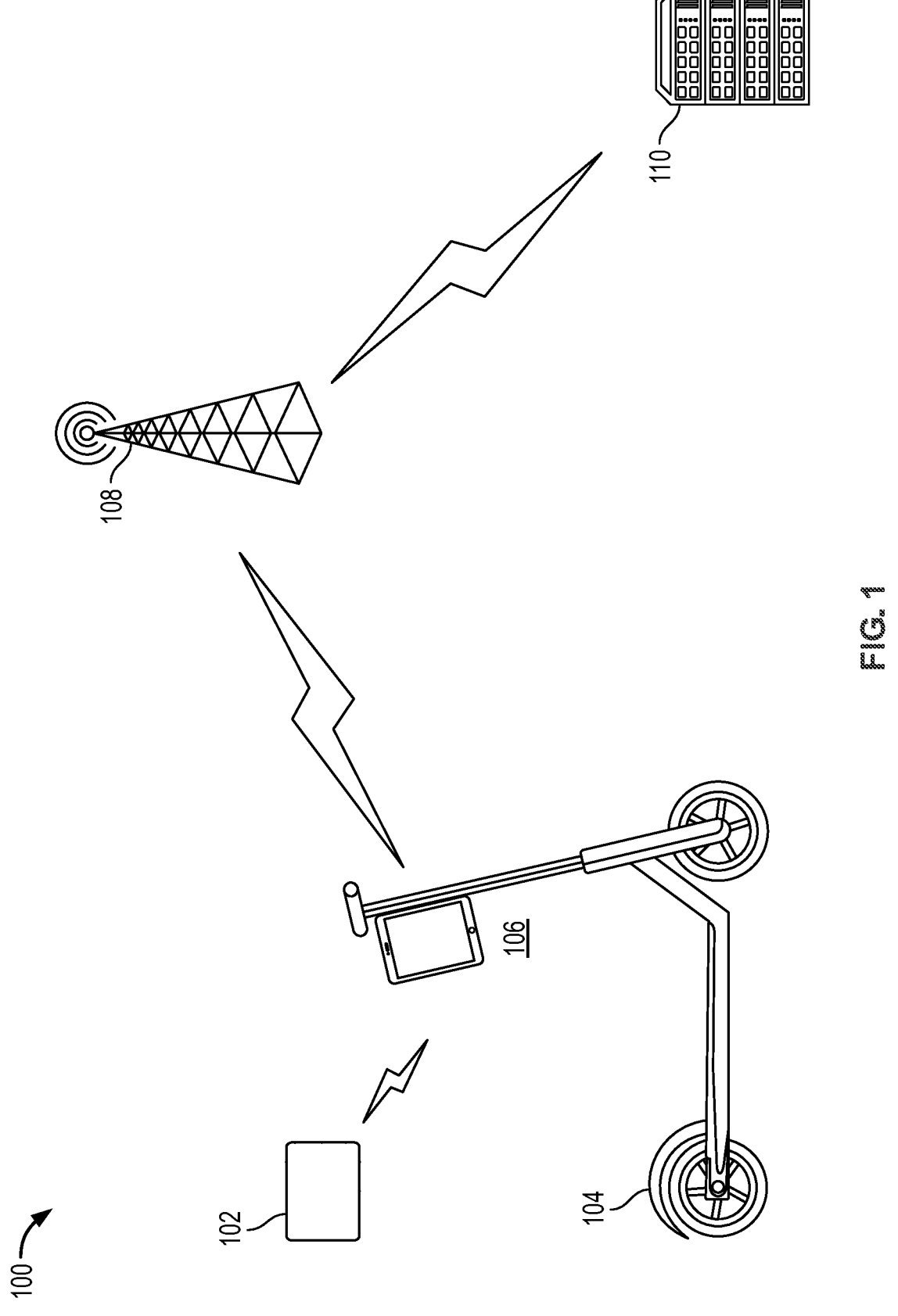
FIG. 1 illustrates an example of a system 100 in accordance with embodiments discussed herein.

Embodiments may be generally directed to systems configured to provide improved one-tap rental services for items using a token, such as a contactless card. For example, embodiments discussed may be configured to enable users to rent items, such as scooters, bikes, chairs, cars, kayaks, paddleboards, or any other type of equipment by tapping their contactless card on a computing device associated with the item. The computing device may be configured to process the information on the card and communicate with one or more servers to provide authentication and payment services for the rental of the item. In embodiments discussed herein may also enable users to purchase services, such as rental time on a computer, access to a streaming service or item, processing time on a cloud computing device and so forth. Embodiments are not limited in this manner.

The systems discussed herein include computing devices, such as mobile devices, computers, servers, networking equipment, etc., configured to enable verification of the token and the user and rent the item. The solutions discussed herein provide advantages over previous solutions to rent items. Previous systems generally required a user to go through a number of steps or operations to rent an item. A user may be required to download and/or configure an application on their mobile device, set up an account for the item, including providing payment information and interact with the application to rent an item. Embodiments discussed herein provide improvements over previous technology by enabling a user to perform a single operation to rent an item by presenting a contactless card to a computing device that can be used to verify the user and provide payment for the rental. As will be discussed in more detail, the contactless card and the computing device are configured to perform an exchange. The information may be further communicated to one or more servers to authenticate the card and user, and to provide payment for the rental. The operation may also be used as a signature for the user to sign or accept terms and conditions for the rental of the item. These operations can be performed without requiring the user to set up an account and provide secure information to the application and a third-party provider of the application.

In one example, the computing device associated with the rental item may be configured to provide the information to the servers in an encrypted format generated by the contactless card. The servers may be configured to receive and process encrypted data generated by the contactless card and rental data corresponding to a rental of an item. For example, the systems may be configured to extract authentication information from the encrypted data that may be used to authenticate or verify the contactless card and the user. Specifically, the systems may perform an authentication routine on the authentication information to authenticate the user. The authenticate routine may include ensuring that the encrypted data can be successfully decrypted with a correct key, and the encrypted data, e.g., a shared secret, matches an authentic shared secret stored on the system. In response to authentication of the card and the user, the system may also perform one or more operations to enable the rental of the item, such as providing payment for the item and accepting any terms or conditions.

In embodiments, the computing device configured to communicate with the contactless card and the servers may be affixed and/or associated with the rental item. The computing device may be configured to communicate wirelessly in accordance with one or more wireless technologies. For example, the computing device may exchange the data with the contactless card when the card is within a wireless short-range communication range. Specifically, the computing device may be configured to periodically emit signals in accordance with a near-field communication (NFC) protocol to energize and detect the contactless card. The device may receive the encrypted data via one or more communication exchanges, which may include authentication information to authenticate a card and the user, and information to pay for the item. The device may be configured to send, to one or more servers, the encrypted data and data associated with the rental of the item to a system in accordance with different wireless technology, e.g., cellular or WiFi communication. The computing device may also be configured to receive an indication from one or more servers to enable the rental of the item and process the indication. For example, the device may receive the indication based on the user being authenticated and a successful payment for the item. In some instances, the computing device may receive an indication to decline the rental of the time, e.g., when the user is not authenticated and/or payment is not received. If the user is authenticated and payment is received, the device may also be configured to cause an action to permit the rental of the item based on the indication. Additional details are provided in the following description.

FIG. 1 illustrates an example of a system 100 in accordance with embodiments discussed herein. The system 100 may be configured to provide one-tap authentication and payment services to enable users to rent or purchase items. The illustrated system 100 includes a limited number of systems, devices, components, etc., for simplistic discussion purposes. In an implementation, the system 100 may include any number of systems, device, components, etc., to provide the functionality discussed herein.

In embodiments, the system 100 is configured to enable users to rent or purchase items, such as item 104. In the illustrated example, the item 104 is a scooter; however, embodiments are not limited in this manner. The item 104 may be any type of item or service that a user may rent or purchase. For example, the item 104 may be any type of vehicle including a scooter, a bicycle, a car, etc. The item may a beach chair, an umbrella, outdoor equipment such as a kayak, a tent, a paddleboard, etc. In some instances, the item 104 may be a service, such as renting time of a computer, processing time, cloud-based storage, etc. Embodiments are not limited to these examples.

In embodiments, the item 104 may include or have a computing device 106 that may be utilized by a user to rent the item 104. In some instances, the computing device 106 may be a special-purpose computer configured only to provide rental services for the user. The computing device 106 may include one or more processing components, such as central processing units, processors, graphic processing units, controllers, etc. The computing device also includes volatile memory, non-volatile memory, input/output (I/O) devices, wired and wireless communication interfaces, displays (touchscreen), and so forth that enable a user to interact with the computing device 106. In one example, the computing device 106 may be a single-board computer, including a circuit board having the processor(s), memory, I/O devices, and other features configured to provide the functionality discussed herein. In embodiments, the item 104 and/or computing device 106 may include one or more location determining devices, such as a global positioning system (GPS) device, a location positioning system (LPS)

using cellular or WiFi stations and signals, systems using triangulation, and so forth. The location determining device may be utilized to determine the location of the computing device 106 and the item 104. In some instances, the computing device 106 may determine a time based on the signals received from a location determining device, e.g., based on a clock or time signal.

In embodiments, the computing device 106 is in a housing that is affixed or integrated into the body of the item 104. The computing device 106 may be attached to the item 104 utilizing any type of attaching mechanism or fastener. In some instances, the computing device 106 may be integrated into the item 104, e.g., located in a molded portion of the handle bars or stem of the scooter, such that it cannot be detached from the item 104. In other examples, the computing device 106 may be integrated or affixed to a locking mechanism for the item 104. For example, the computing device 106 may be for a locked storage system (lockers) that enables access to the item 104 once the user is authenticated. As will be discussed in more detail, the computing device 106 may be configured to control (lock/unlock) the locking mechanism based on the card and user being authenticated.

In embodiments, the computing device 106 includes one or more wireless interfaces configured to communicate with other devices of the system 100. For example, the computing device 106 may include a short-range wireless communication interface configured to communication in accordance with a short-range communication protocol, such as NFC, Bluetooth, any other short range RF protocol, or infrared (IF) protocol. In embodiments, the computing device 106 may utilize the short-range wireless communication interface to communicate with devices, including the contactless card 102.

Figure 9:
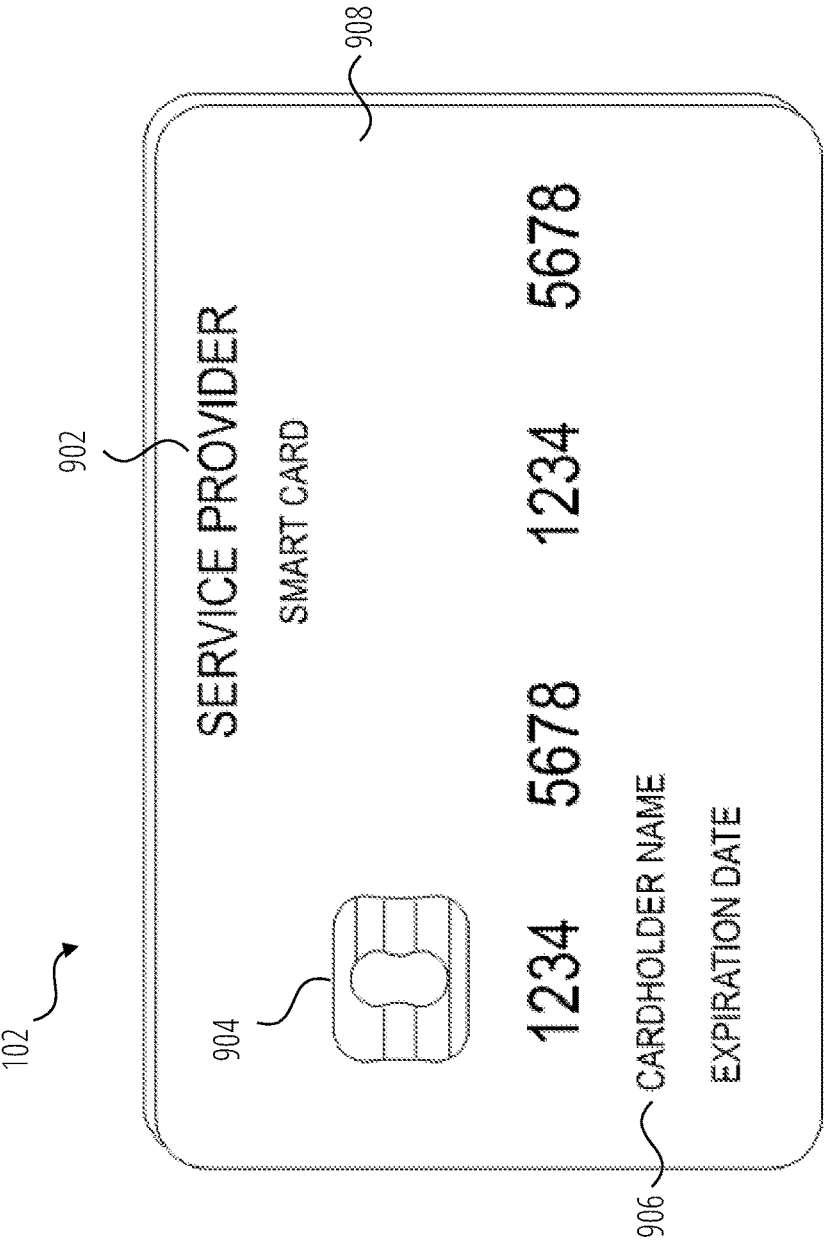
FIG. 9 illustrates a contactless card 102 in accordance with one embodiment.
Figure 10:
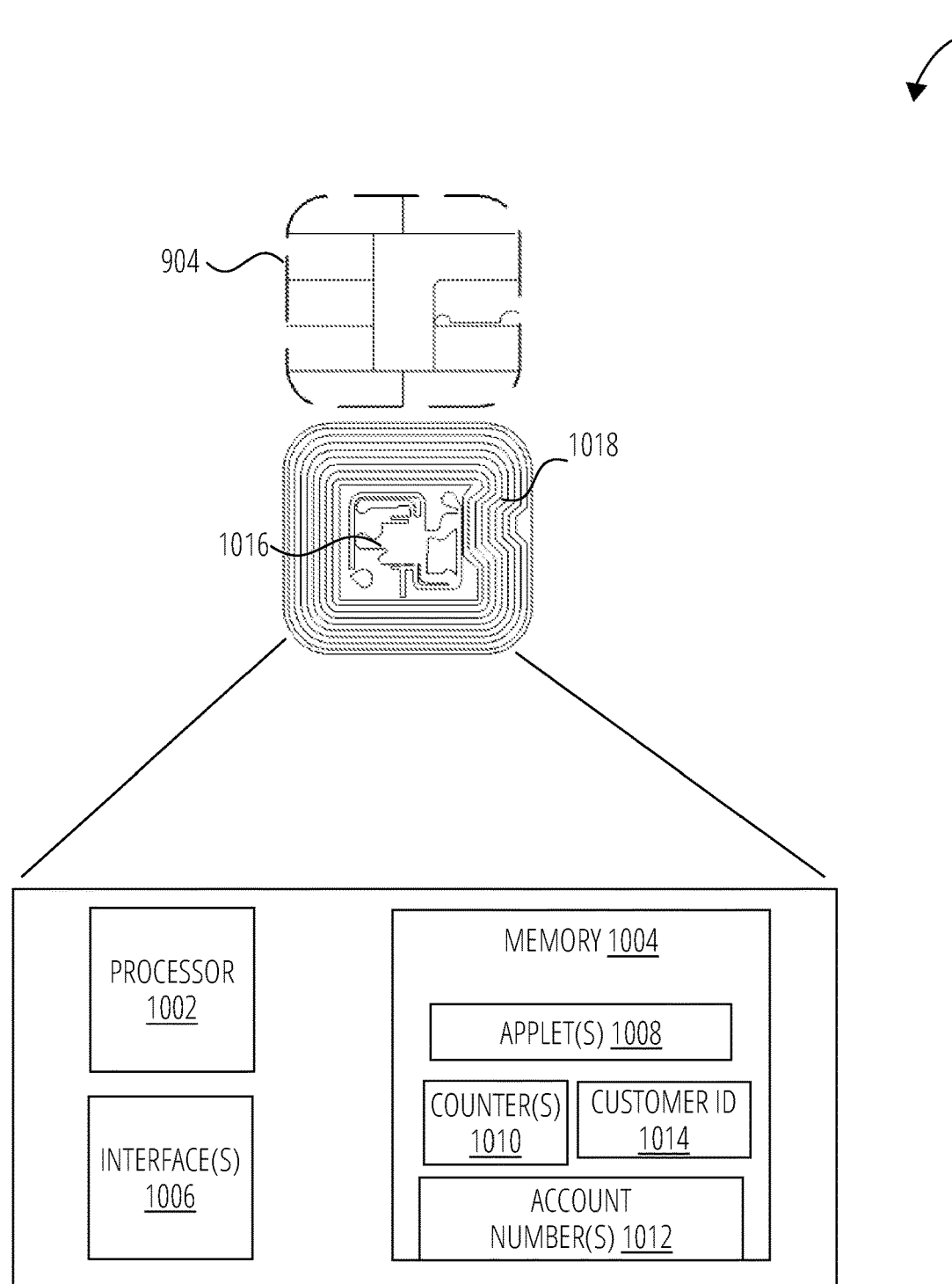
FIG. 10 illustrates a transaction card component 1000 in accordance with one embodiment.
Figure 11:
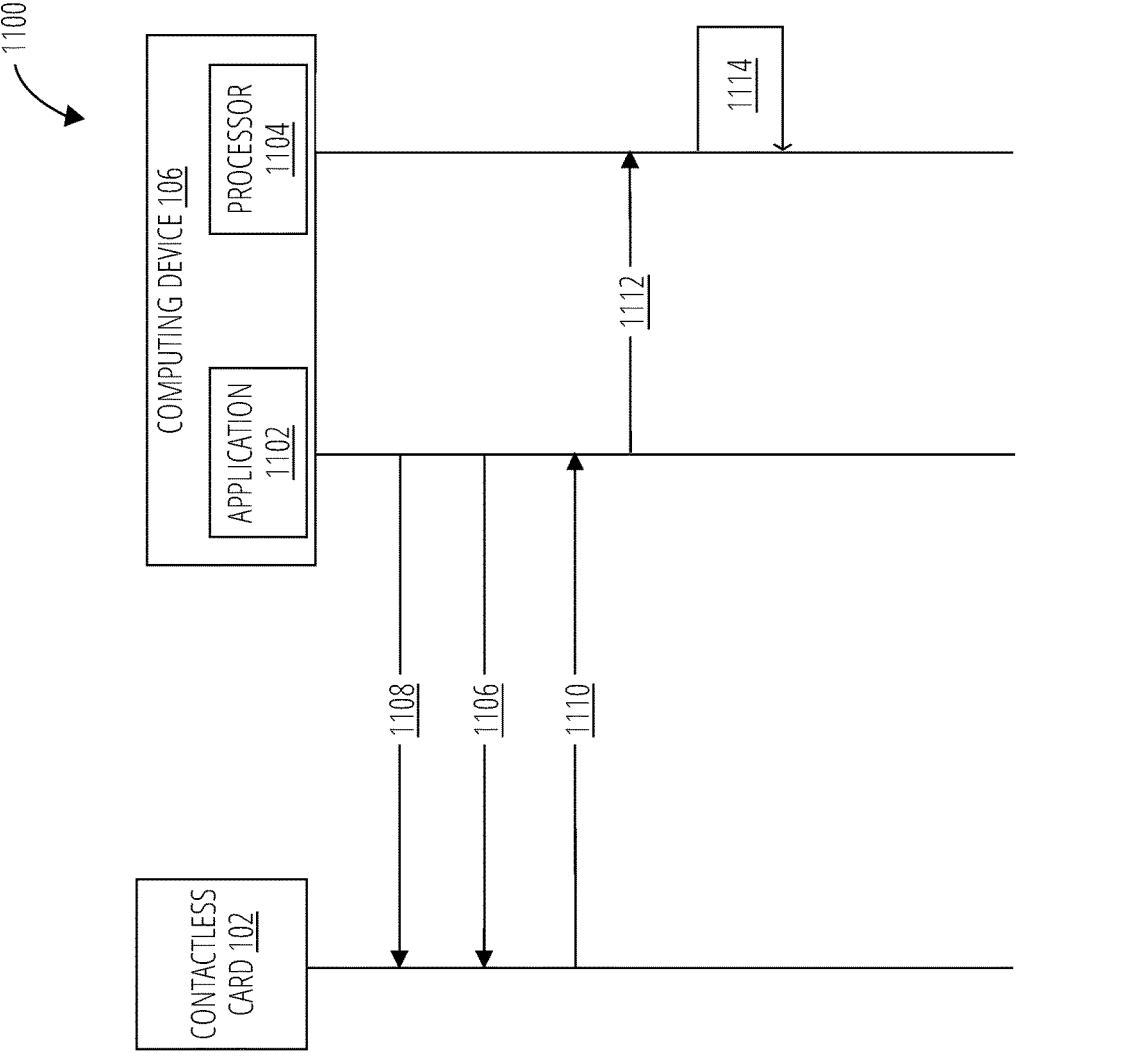
FIG. 11 illustrates a sequence flow 1100 in accordance with one embodiment.

In embodiments, the contactless card 102 and the computing device 106 are configured to communicate when they are brought within a short-range wireless communication range of each other, e.g., 10 centimeters for NFC. For example, the computing device 106, including the short-range wireless communication interface, periodically energizes to cause one or more signals to be emitted that further energize circuitry on the contactless card 102 to communicate. The contactless card 102 and computing device 106 may be configured to initiate a communication exchange, such as an NFC communication exchange, to establish a connection between each other and communicate data, for example. In some instances, the user may tap or touch the contactless card 102 to the computing device 106 to ensure that the contactless card 102 is within communication range with the computing device 106 to exchange the data. The data may include a shared secret that may be used to authenticate the card and/or the user, a customer identifier, one or more account numbers, one or more counter values, and so forth. FIG. 9 and FIG. 10 illustrate and discuss more detail with respect to the contactless card 102. In some instances, the contactless card 102 may be configured to encrypt the data to communicate computing device 106. FIG. 11 illustrates one possible sequence 1100 that may be performed between the contactless card 102 and the computing device 106 to exchange data for the authentication operations and FIG. 12 through FIG. 16 illustrate and discuss additional detail for communicating the data in a secure manner utilizing diversified keys.

In embodiments, the contactless card 102 may generate encrypted data and communicate the data to the computing device 106. The computing device 106, in turn, may communicate the encrypted data to one or more other systems, devices, servers, etc., to authenticate the user and provide payment information. For example, the computing device 106 may utilize one or more wired and wireless networks, such as network 108, to communicate with the system(s) 110.

Network 108 may be one or more of a wireless network, a wired network or any combination of wireless network and wired network, and may be configured to connect computing device 106 to system(s) 110. For example, network 108 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11 family of standards, IEEE 902.15.x (wireless PAN family), Bluetooth, NFC, Radio Frequency Identification (RFID), Wi-Fi, and/or the like. In addition, network 108 may include hardware and infrastructure, without limitation, telephone lines, fiber optics, IEEE Ethernet 802.3, a wide area network, a wireless personal area network, a LAN, or a global network such as the Internet. In addition, network 108 may support an Internet Protocol (IP) network, a wireless communication network, a cellular network, or the like, or any combination thereof. Although network 108 is depicted as a single network, it should be appreciated that according to one or more examples, network 108 may include a plurality of interconnected networks.

In embodiments, the computing device 106 may communicate data to the system(s) 110 via the network 108 to authenticate the user, provide payment information, and enable the user to rent the item 104. In embodiments, the system(s) 110 may be operated by an owner or provider of the item 104 and/or a bank to provide authentication and payment services. For example, the system(s) 110 may be incorporated into a scooter rental system to provide rental scooters in a market, such as in a city. The system(s) 110 may include physical servers in a location operated and maintained by the item provider or may be cloud-based computing servers system(s) 110 that provide services to the item provider on demand.

In some instances, one or more of the system(s) 110 may include servers maintained and operated by a banking system to provide the authentication services and payments services to rent the item 104. Additionally, the system(s) 110 controlled by the banking system may be associated with the contactless card 102. As will be discussed in more detail in FIGS. 2A and 2B, the system(s) 110 may include a rental server, an authentication server, and a payment server. The rental server may be controlled and operated by the rental company and the authentication server and payment server may be controlled and operated the bank. The rental server may provide rental services and the authentication server and payment server may provide authentication and payment services for the rental of the item 104.

Figure 2B:
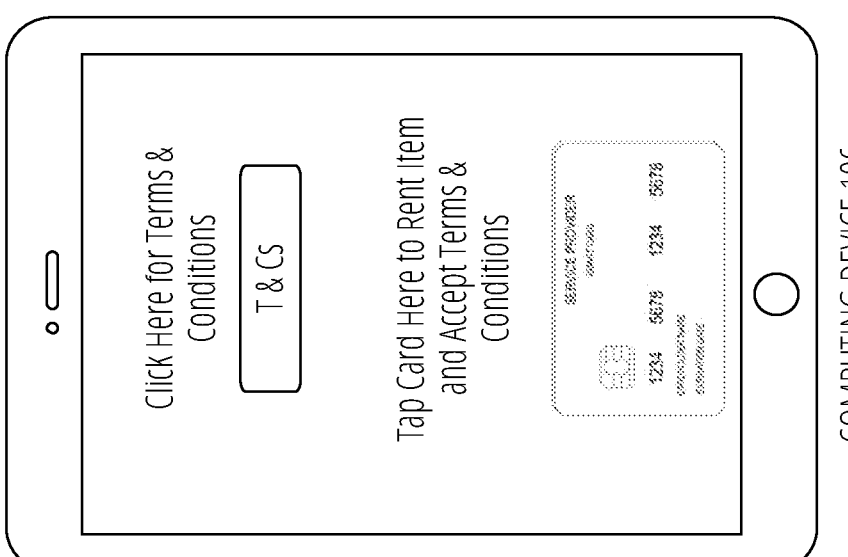
FIG. 2B illustrates an example display on a computing device in accordance with embodiments discussed herein.
Figure 2A:
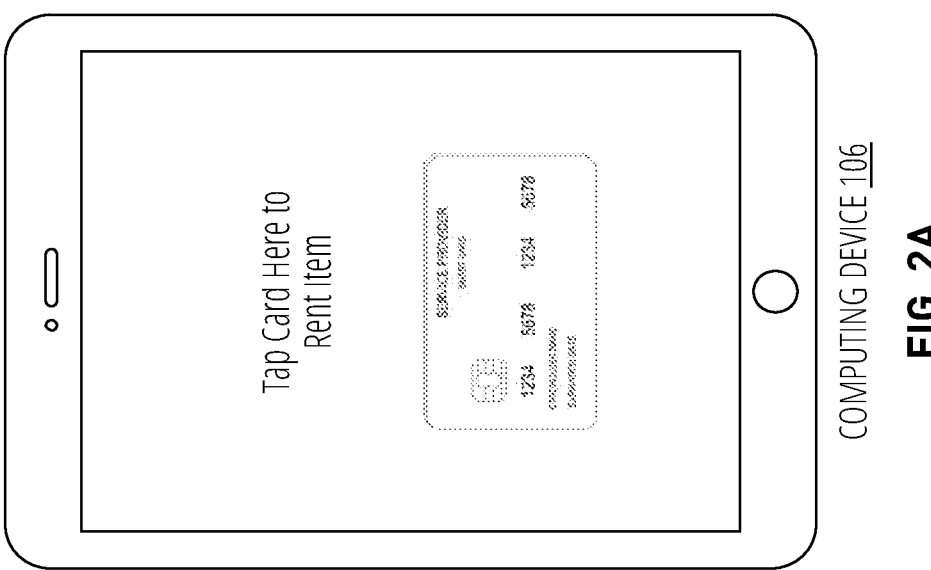
FIG. 2A illustrates an example display on a computing device in accordance with embodiments discussed herein.

FIG. 2A illustrates an example display that may be displayed by the computing device 106, including instructions for the user to perform a single-tap operation with a token, such as a contactless card 102, to rent an item.

In embodiments, the computing device 106 may include a display device, such as a touchscreen display, capable of display text and images. In the illustrated example of FIG. 2A the computing device 106 is configured to display an indication, such as "Tap Card Here to Rent Item" and image of a contactless card, on the display device. The indication and the image presented on the display device ensures that a user brings the contactless card 102 close enough to the computing device 106 to perform a communication exchange, as described herein.

In some embodiments, the computing device 106 be configured with a display device of any type including a liquid crystal display (LCD), light-emitting diode (LED) display, a plasma display, or any other type of flat panel system. In some instances, to preserve battery power, the display device may be an electronic ink (e-ink) display configured to display the indications. The e-ink display may hold state and display the indications even when power is not being applied to the display device, saving power and battery usage, for example. In some instances, the computing device 106 may maintain the display device in an off or standby state and may be configured to detect an object, such as a person, near the computing device 106, e.g., via one or more sensors. For example, the computing device 106 may include a proximity sensor configured to detect the person and the computing device 106 may be configured to light the display device and display the indications based upon a detection.

In embodiments, the computing device 106 may detect the contactless card 102 when it is brought within a communication range of an interface and the computing device 106 and exchange information with the card, as discussed herein.

FIG. 2B illustrates another example display that may be presented to the user on a display device to rent an item. In the illustrated example, the display may present an indication to review terms and conditions to rent the item, e.g., such as the text "Click Here for Terms & Conditions" and a button. The computing device 106, including the display device may be configured to detect a user selection of the button on the display device and display the terms and conditions for the user to review. The terms and conditions may be stored in memory or retrieved by the computing device 106 via an Internet server.

In embodiments, the computing device 106 may include an indication for the user to accept the terms and conditions and to initiate rental of the item with a single tap of the contactless card 102. For example, the display device in FIG. 2B may also be configured to present text, such as "Tap Card Here to Rent Item and Accept Terms and Conditions" and an image of the contactless card. As similarly discussed in FIG. 2A, the computing device 106 may detect the contactless card 102 and perform an exchange of data with the contactless card, as discussed herein.

Figure 3A:
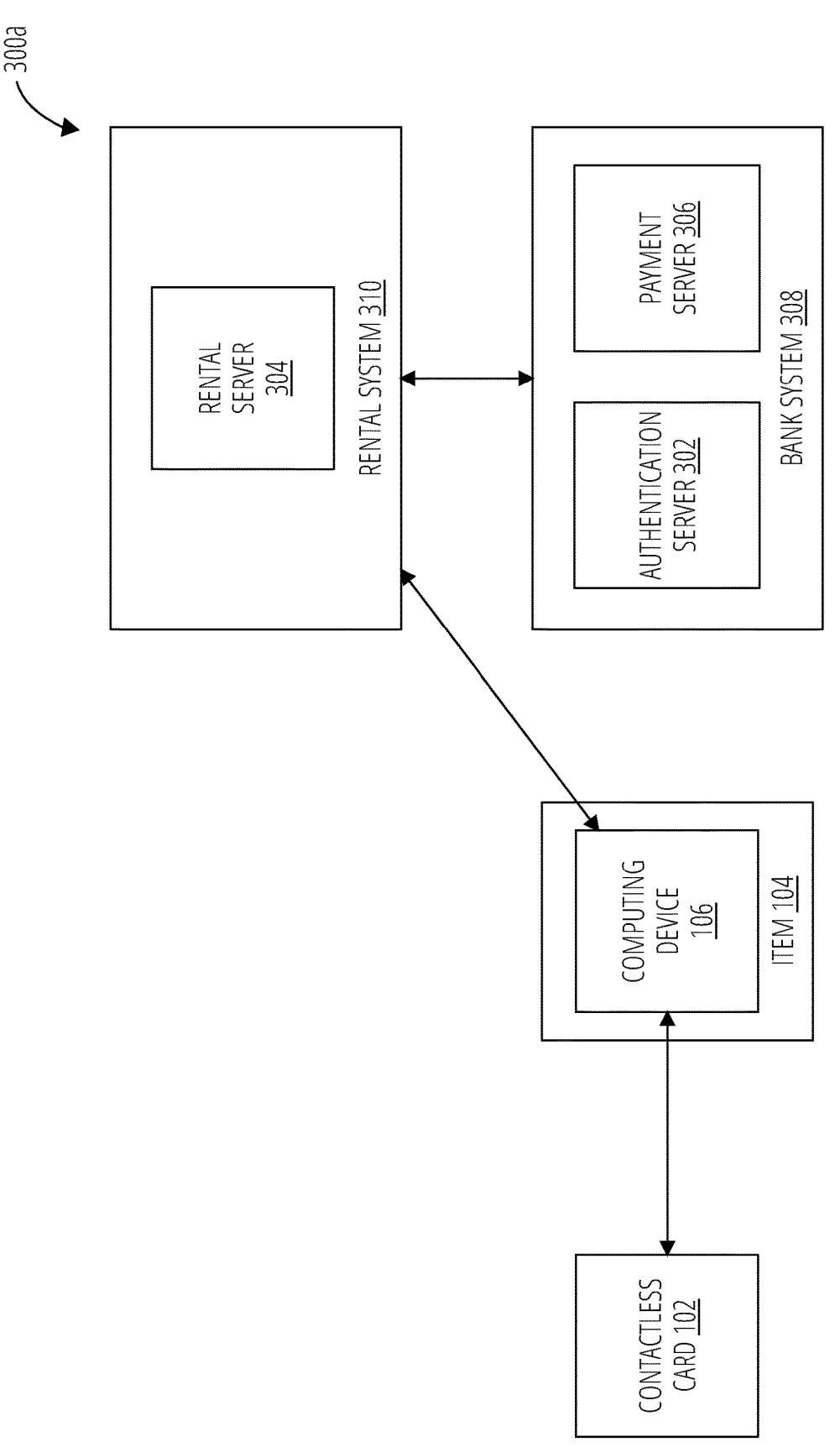
FIG. 3A illustrates a first example configuration of a system 300a in accordance with embodiments discussed herein.

FIG. 3A illustrates a first example configuration of a system 300a to perform the operations discussed herein, including enabling a user to rent an item 104 with one tap of a contactless card. In the illustrated example, the computing device 106 is coupled with the item 104 and is configured to communicate with a rental system 310, including a rental server 304. In the illustrated example, the rental server 304 is configured to provide a number of services, including authenticating the card, confirming payment, and providing rental management services, e.g., monitoring and tracking one or more items, communicating with items, processing payment for rental of the items, and so forth.

In embodiments, a user may wish to rent item 104, which may be any type of rental item, as previously discussed. The item 104 may be coupled with a computing device 106, which may be physically affixed to the item 104, molded into the item 104, or located in another housing associated with the item 104. In some embodiments, the computing device 106 may be implemented in storage facility (e.g., a locker) associated with the item 104 and/or control a locking mechanism for the item 104.

In some embodiments, the computing device 106 is configured such that a user may rent the item 104 with a single tap of a token, such as contactless card 102. For example, the computing device 106 can be configured to periodically scan or attempt to detect a token or the contactless card 102, e.g., by energizing a short-range wireless communication interface, to probe for contactless cards and detect when contactless card 102 is within communication range of the computing device 106. The computing device 106 and/or item 104 may be affixed with a sticker or placard having instructions to the user to bring the contactless card 102 near the computing device 106 to ensure that the contactless card is within communication range. In some embodiments, the instructions may instruct the user to tap the contactless card 102 on the computing device 106. The computing device 106 may also include a display device, such as a flat panel display, a light-emitting diode (LED) display, a liquid crystal display (LCD), or the like configured to display the instructions. In one example, the display may display instructions to tap the card to the display and a graphical representation of the card indicating a location where to tap the card.

In other instances, the computing device 106 may include one or more interfaces, such as a touchscreen display, and the user may interface with the computing device 106 via the touchscreen display to initiate the rental of the item 104. For example, the computing device 106 may present one or more GUI(s) for the user to make selections, such as an indication to rent the item 104, an amount of time to rent the item 104, a payment method to rent the item 104, accept terms and conditions for the rental, and so forth. In these instances, the computing device 106 may receive and process user selections corresponding to the parameters of the rental of the item 104 and instruct the user to bring the contactless card 102 near or on the computing device 106 to initiate an exchange with the contactless card 102. In some instances, the computing device 106 may not include a display. In these instances, the user may accept the terms and conditions via universal terms and conditions agreed to upon activation of the contactless card 102 or have previously activated a tap-to-rent feature for the card through a banking system.

The computing device 106 is configured to initiate a communication exchange with the contactless card 102 when the contactless card 102 is within wireless communication of the computing device 106 based on the communication protocol being used to communicate. For example, the computing device 106 may be configured to communicate in accordance with the NFC protocol and may initiate an NFC exchange with the contactless card 102 when the contactless card 102 is within the NFC communication range, e.g., ~10 centimeters (cms). In embodiments, the computing device 106 initiates an exchange with the contactless card 102, and the contactless card 102 sends data to the computing device 106. The data may include authentication information, such as a shared secret, a customer identifier or other unique identifiers. The data may also include information to enable payment for the rental, such as an account number or information associated with the customer's account that may be used to identify the account. In some instances, the contactless card 102 may send the data encrypted.

For example, the contactless card 102, to send the data to the computing device 106, may generate a message authentication code (MAC) cryptogram. In some examples, this may occur when the contactless card 102 is read by the computing device 106. In particular, this may occur upon a read, such as an NFC read, of a near field data exchange (NDEF) tag, which may be created in accordance with the NFC Data Exchange Format. For example, the computing device 106 may include a reader application configured to perform a read operation to read data from the contactless card 102. The contactless card 102 may generate the message including the cryptogram, which may include a header and the shared secret, a customer identifier or other identifying information, account information, or a combination thereof. The contactless card 102 may generate a MAC cryptogram (encrypted data) from the message, and the MAC cryptogram may be further encrypted, as further discussed in FIG. 11, e.g., with random data utilizing a diversified or session key. The contactless card 102 may communicate the MAC cryptogram in an NDEF message format responsive to a "Read NDEF file" message received from the computing device 106.

In some instances, the computing device 106 and the contactless card 102 may exchange data in accordance with the different protocols. For example, communication may occur via Bluetooth, Wi-Fi, or other means of wireless data communication. Embodiments are not limited in this manner.

In embodiments, the computing device 106 may receive the data from the contactless card 102 and store the data in a memory. In some instances, the computing device 106 may provide an indication to the user that the data is successfully received or not received from the contactless card 102. For example, the computing device 106 may present the indication on a display in a GUI. In other instances, the computing device 106 may provide the indication by lighting one or more light emitting diodes (LEDs) corresponding to whether the data is received or not received.

The computing device 106 may further initiate a communication with one or more systems to process the rental of the item 104. In the illustrated example, the computing device 106 may send one or more messages to a rental system 310, including a rental server 304. The computing device 106 may send the one or more messages via a network, such as network 108. In embodiments, computing device 106 is configured to communicate in accordance with one or more cellular communication protocols including, but not limited to, Global System for Mobile Communications (GSM), General Packet Radio Service (GPRS), cdmaOne, CDMA2000, Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/TDMA), Long Term Evolution (LTE), 5th Generation (5G), and Integrated Digital Enhanced Network (iDEN).

In some instances, the computing device 106 may be configured operate a battery. In embodiments, the battery may be dedicated to the computing device 106 or may be a battery also configured to supply power to the item 104. The computing device 106 may be configured to reduce power consumption to extend the battery life. As one example, the computing device 106 may be configured to communicate with network 108 utilizing a lower-powered cellular technology. For example, the computing device 106 may be configured to communicate utilizing low-power wide-area network (LPWAN) protocol, low-power wide-area (LPWA) network protocol or low-power network (LPN) protocol, or any other type of wireless telecommunication wide area network designed to allow for long-range communication at a low bit rate.

In embodiments, the computing device 106 is configured to communicate the messages in accordance with a messaging communication protocol. For example, the computing device 106 may be configured to communicate with the rental server 304 in accordance with publish-subscribe protocol, such as the message queuing telemetry transport (MQTT) protocol configured to operate over transmission control protocol (TCP)/Internet Protocol (IP) or any other network protocol that provides ordered, lossless, bi-directional connections. MQTT may be utilized in implementations that require a small code footprint (reduced availability of memory) and/or low-bandwidth implementations. In one example, the computing device 106 may be configured to publish data, and the rental server 304 may subscribe to the data in accordance with the MQTT protocol. The data may include rental data or information. The rental data may include an item identifier, a date/time of rental, a location of rental, and other parameters of the rental. The data also may include the encrypted data from the contactless card 102. For example, the computing device 106 may publish the cryptogram to communicate the cryptogram to the rental server 304. In embodiments, the communications between the computing device 106 and the rental server 304 may be secured using one or more secure/encryption techniques.

In embodiments, the computing device 106 and rental server 304 may utilize other message protocols to communicate data. In some implementations, at least a portion of the data may be communicated in accordance with a representational state transfer (RESTful) JavaScript Object Notation (JSON) communication protocol. For example, the computing device 106 is configured to utilize a PUT command to send the data to a location or address of the rental server 304, e.g., https://rentalserver.com/parameters, where the parameters may include the rental data (item identifier), date/time, location, etc. In some instances, the computing device 106 may be configured to send the information from the contactless card 102 to the rental server 304 as one or more parameters, e.g., the cryptogram, a token, an account number, a customer name, a CVV, etc. In some implementations, the rental server 304 may be configured to retrieve the data from the computing device 106. For example, the rental server 304 may be configured to execute a GET command to retrieve at least a portion of the data from the computing device 106. Embodiments are not limited to these examples. In some implementations, the computing device 106 and rental server 304 may communicate data between each utilizing a combination of the MQTT and RESTful JSON messaging protocols and/or additional/different protocols, e.g., extensible markup language (XML) and/or hypertext transfer protocol (HTTP) or secure HTTP (HTTPS).

The rental server 304 is configured to receive and process the data to enable rental of the item 104. For example, the rental server 304 may store the rental data in a database or data store to track a rent of an item 104. Specifically, the rental server 304 may store an identifier of the item with a start date/time of the rental for the item. For time based rentals, the rental server 304 may also receive an end date/time from the computing device 106 and calculate a cost for the rental to charge the account associated with the contactless card 102. Specifically, the rental server 304 may use the start date/time and the end date/time to calculate a rental time and determine a cost for the rental of the item 104.

The rental server 304 may also process the data from the contactless card 102 to verify the card and to process payment for the rental of the item 104. In some instances, the rental server 304 may utilize a bank system 308 including an authentication server 302 to authenticate the contactless card 102. For example, the rental server 304 may communicate the cryptogram from the contactless card 102 to the authentication server 302 to authenticate the contactless card. In some embodiments, the rental server 304 may be configured to communicate with the authentication server 302 using RESTful JSON messaging protocol API(s). For example, the rental server 304 may execute a command including calling an authentication method with the cryptogram as a parameter (or information from the cryptogram as parameter(s)) at the location or address of the authentication server 302, e.g., https://authenticationserver.com/authenticatemethod/parameters. The authentication server 302 may authenticate the card and/or the user and return a result. Embodiments are not limited to this example implementation and other message protocols/formats may be used to communicate the data from the contactless card 102 to the authentication server 302.

In embodiments, the authentication server 302 may be part of a bank system 308, e.g., owned and operated by a bank, and is configured to perform authentication operations to authenticate the card and the user. Specifically, the authentication server 302 ensures that the data from the contactless card 102 is valid and the user is authentic. In embodiments, the authentication server 302 may be configured to receive the data and perform one or more authentication operations, e.g., ensuring that encrypted data is encrypted with a correct key and the data from the contactless card 102 matches stored/authenticated data.

Figure 15:
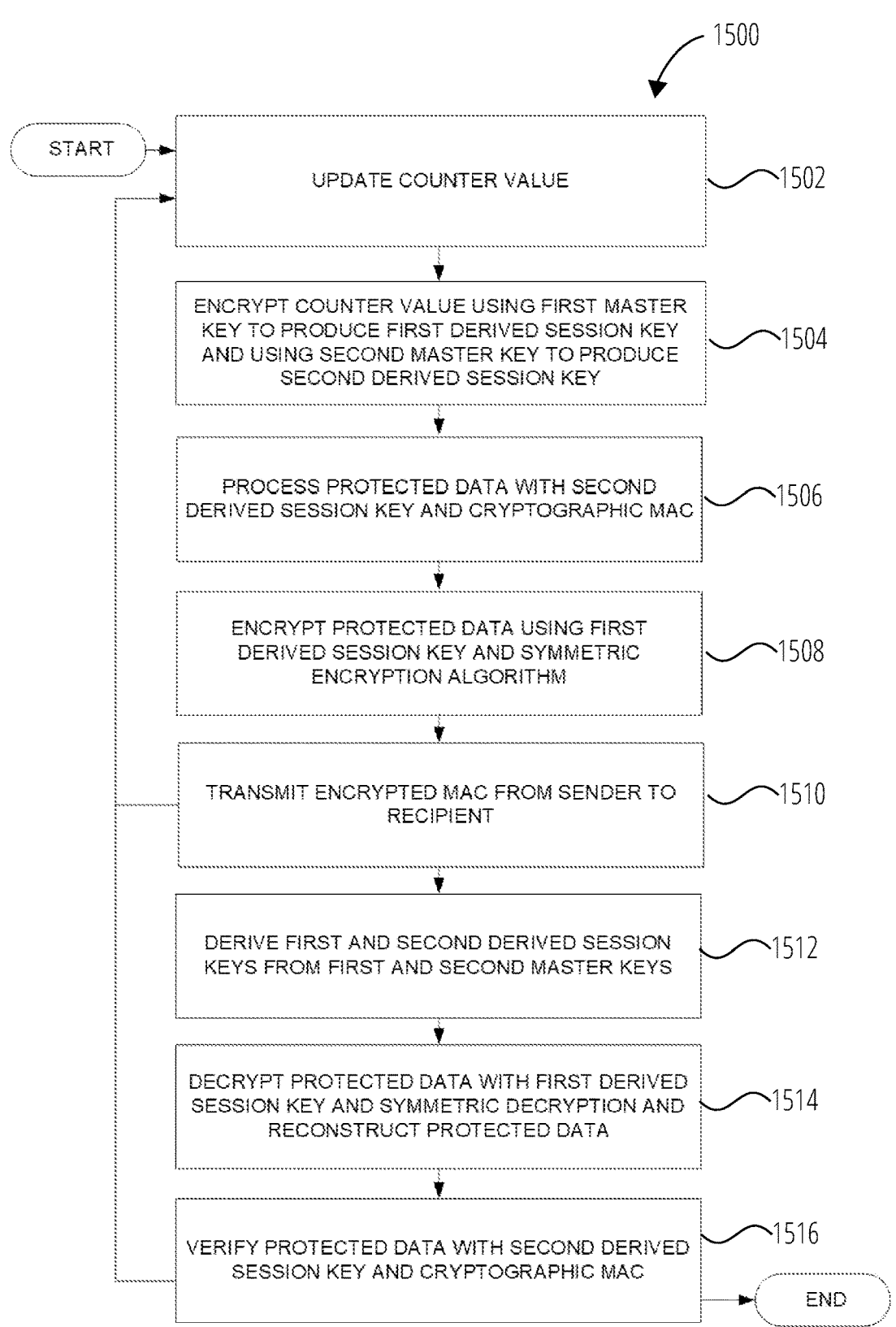
FIG. 15 illustrates an aspect of the subject matter in accordance with one embodiment.

For example and as discussed in more detail in FIG. 15, the authentication server 302 may confirm when a successful authentication is determined when the following conditions are met. First, the ability to verify the MAC shows that a derived session key was proper for the contactless card 102. The MAC may only be correct if the decryption was successful by the authentication server 302 and yielded the proper MAC value. The successful decryption may show that the correctly derived encryption key was used to decrypt the encrypted MAC. Since the derived session keys are created using the master keys known only to the sender (e.g., the contactless card 102) and the recipient (e.g., the authentication server 302), it may be trusted that the contactless card which originally created the MAC and encrypted the MAC is indeed authentic. Moreover, a counter value used to derive the first and second session keys may be shown to be valid and may be used to perform authentication operations. Similarly, the authentication server 302 may use other information in the data from the contactless card 102 to authenticate the contactless card 102, e.g., by comparing a shared secret, a customer identifier, or other information stored on the contactless card 102 with authenticated information stored on the authentication server 302. For example, the authentication server 302 may retrieve an authentic shared secret from memory or a database, compare the authentic shared secret with the shared secret from the contactless card 102 and confirm that they may to authenticate the contactless card 102.

In embodiments, the authentication server 302 authenticates the card and provides an indication to the rental server 304. Specifically, the authentication server 302 may communicate one or more messages to the rental server 304, including an indication as to whether the card is authentic or not authentic based on the data from the contactless card

102. If the card is not authentic, the computing device 106 and/or the rental server 304 prevents the item 104 from being rented, e.g., by maintaining a lock on the item 104, providing an indication to a user via an interface, etc. If the card is authentic, the system 300a, including the computing device 106 and the rental server 304 may continue to process data to enable the user to rent the item 104.

In some instances, the system 300a may require the user to perform two-factor or multifactor authentication, such that the user associated with contactless card 102 may also be authenticated. Any number of additional authentications may be performed by the authentication server 302. For example, the system 300a may require the user to provide an additional piece of information, e.g., enter a PIN, a password, an address, a telephone number, etc., to the 106 one or more interfaces that may be provided to the authentication server 302. The authentication server 302 may confirm that the additional piece of information is authenticated and is associated with the contactless card 102. In another example, the authentication server 302 may require and/or determine that the user is in possession of another device, such as a mobile device, by sending a one-time passcode to the device and having the user respond to the code and/or enter the code into the computing device 106, enter the code into a bank app, respond to the message, etc. Additional authentication methods may be used, e.g., authentication applications, to authenticate the user.

In embodiments, the authentication server 302 may return a result of authentication operations performed to the rental server 304 as one or more messages in accordance with a message protocol. The rental server 304 is configured to process the result and determine whether to proceed with rental of the item 104 or not. For example, if the rental server 304 receives an indication that the card and/or the user is authenticated, the rental server 304 may send one or more messages to the computing device 106 to enable rental of the item 104. The message(s) may include an indication that the rental is permitted. If the card and/or the user cannot be authenticated, the rental server 304 may not permit rental of the item 104 by sending one or more messages indicating the rental is denied to the computing device 106.

In embodiments, the computing device 106 may receive an indication indicating whether the rental is permitted or not permitted and process the indication accordingly. For example, the computing device 106 may send one or more signals to a locking mechanism to cause a lock to unlock if the rental is permitted. Other examples may include sending one or more signals to a motor to enable the item 104. If the rental of the item 104 is denied, the computing device 106 prevents the item 104 from being rented and may provide an indication to the user, e.g., presenting an indication in a display. Examples may include sending a signal to maintain or release a brake for the item, enable or disable a motor for the item, maintain or release a locking mechanism for the item, and so forth.

In embodiments, the rental server 304 is configured to process payment for the rental of the item 104. For example, the rental server 304 may utilize the payment server 306 to collect payment for the rental based on the data collected from the contactless card 102 and the rental data. In embodiments, the rental server 304 may determine an amount for the rental, either at the time of rental or upon completion of the rental (e.g., based on the start time/date and end time/date), and communicate with the payment server 306 to collect the payment from an account associated with contactless card 102 and the user. In one example, the rental server 304 is configured to interface with the payment server

306 via an API to collect payment, e.g., send a payment request. The API may also be a RESTful JSON API and include a payment method that may be called using a GET command by the rental server 304, for example. The rental server 304 may invoke the GET command with the address of the payment server 306 to invoke with the payment method and include one or more parameters to enable the payment server 306 to process the payment, e.g., https://paymentserver.com/payment method/parameters. The parameters may include data from the computing device 106, such as the cryptogram, including an account number. The payment server 306 may process the payment by transferring funds from the user's account to an account associated with the rental system 310 and provide an indication to the rental server 304. The indication may indicate that the payment was successful or not successful.

Although illustrated as two separate servers, the authentication server 302 and payment server 306 may be implemented in the same server or in a cloud-based computing system. Each of the servers may include components such as one or more processors, memory, interfaces, displays, I/O devices, etc., as previously discussed.

Figure 3B:
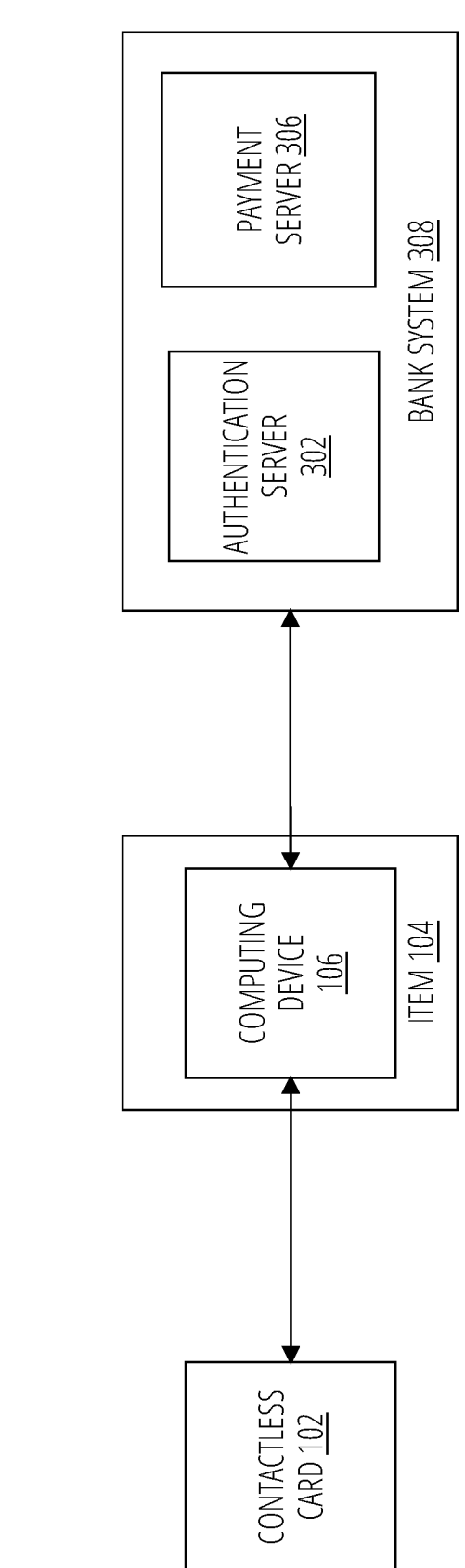
FIG. 3B illustrates a second example configuration of a system 300a in accordance with embodiments discussed herein.

FIG. 3B illustrates a second example of a system 300b configured to perform operations discussed herein. In the illustrated example, the computing device 106 may be configured to communicate directly with the bank system 308 to enable users to rent an item 104.

In embodiments, the computing device 106 is configured to detect an attempt to rent item 104 and to process communications with the contactless card 102, as discussed above in FIG. 3A. For example, the computing device 106 may perform one or more NFC exchanges to receive encrypted data from the contactless card 102. The encrypted data may be a cryptogram or a MAC cryptogram and include data that may be used to authenticate the card, and in some instances, the user. The data may be received from the contactless card 102 and stored in a memory of the computing device 106 for communication to the bank system 308.

In embodiments, the computing device 106 is also configured to determine rental data in system 300b in the same manner as discussed in FIG. 3A. For example, the computing device 106 may determine rental data such as a time/date of a rental based on a location device, such as GPS. The computing device 106 is also configured to determine the status of the item 104 based on one or more sensors of the item 104, e.g., a battery sensor. In some instances, the computing device 106 may determine the amount of time for the rental based on a user input entered via a touchscreen interface or another input device. Embodiments are not limited in this manner.

In embodiments, the computing device 106 is configured to communicate with the bank system 308 to enable rental of the item 104. For example, the computing device 106 may communicate over a network, such as network 108, to send the encrypted data, the rental data, the payment request, or a combination thereof to the bank system 308. In embodiments, the computing device 106 may be configured to directly communicate with bank system 308 using one or more APIs, such as the MQTT configured and/or the RESTful JSON API(s), in a similar or same manner as the rental system 310 communicates with the bank system 308, e.g., by issue one or more API commands based on a location or address of the bank system 308. For example, to authenticate the card/user, the computing device 106 may call the authentication server 302 at an address via a command, e.g., https://authenticationserver.com/authenticatemethod/parameters, wherein the parameters include the cryptogram. Similarly, to obtain payment for the rental, the computing device 106 may call the payment server 306 at an address via a command, such as https://paymentserver.com/payment method/parameters, where the parameters include rental data.

In embodiments, the bank system 308, including the authentication server 302 may perform the authentication operations to authenticate the card, e.g., based on whether the encrypted data can be correctly decrypted and the information on the card matches stored authentic information. In this configuration, the bank system 308 may also be configured to implement two or multi-factor authentication to authenticate user.

The bank system 308 is configured to return a result of the authentication operation(s) to the computing device 106, e.g., as a return to the API calls. The result may indicate whether the card and/or the user are authentic. If the card and/or the user is not authentic, the computing device 106 prevents the item 104 from being rented, e.g., maintain a lock for the 104. If the card, and in some instances, the user are authenticated, the computing device 106 enables the user to use the item 104, e.g., by sending one or more signals to a locking mechanism to unlock the item 104.

In some instances, the computing device 106 may know or have determined an amount of time for the rental and calculate a price for the rental. The computing device 106 may communicate the payment request to the bank system 308, including a payment server 306 to process payment. The bank system 308 may return a result indicating was successful or not successful. If payment is not successful, the computing device 106 is configured to prevent the rental of the item 104. If the payment is successful, the computing device 106 is configured to enable rental of the item 104.

In some instances, the computing device 106 may determine an amount to charge the user based on the amount of time the user utilizes the item 104. For example, the computing device 106 including the location determination device may determine a start time for the rental and an end time for the rental, and the computing device 106 may calculate a total rent time and amount for the rental time. The computing device 106 may send a payment request to the bank system 308 to process the payment.

In these instances, the computing device 106 may determine the end time based on a time period expiration or an indication entered by a user. When the payment is not received until upon completion of the rental, the computing device 106 may send one or more test payments to bank system 308 to ensure that the payment of the rental will be processed successfully. The test payments may include an arbitrarily nominal amount that may be subjected to the total amount charged at the end of the rental. Embodiments are not limited in this manner.

FIG. 4 illustrates an example routine 400 that may be performed by systems discussed herein to authenticate and process contactless cards. In embodiments, the routine 400 may be performed by one or more servers of a bank system, such as bank system 308 illustrated in FIG. 2A/2B.

In block 402, the routine 400 includes receiving encrypted data generated by a contactless card corresponding to a rental of an item. For example, a bank system may receive a cryptogram from a rental system or a computing device via one or more wired or wireless networks. The cryptogram may be encrypted by the contactless card with a diversified key generated with a master key, as described herein. The encrypted data may include a shared secret, a unique identifier, an account number, a CVV, and so forth. In one example, the bank system may be configured with one or more APIs for the rental system and/or computing device to utilize to call the bank system including an authentication server to communicate the encrypted data.

In block 404, the routine 400 includes extracting authentication information from the encrypted data. For example, the bank system may generate a diversified key using a stored master key associated with a customer and/or the contactless card and stored in a data store. The bank system may verify that the authentication information is successfully extracted, indicating that the contactless card utilized a correct diversified key to generate the encrypted data. In some instances, the system may apply additional decryption algorithms to extract the data. For example, the encrypted data may be a MAC cryptogram, and the system may apply a message authentication code decryption operation.

In block 406, the routine 400 includes performing an authentication operation on the authentication information to authenticate the contactless card. In addition to determining the correct diversified key is used to encrypt the data, the system may also compare one or more portions of the data with stored verified data. For example, the system may determine that a shared secret, a unique identifier, an account number, or a combination thereof matches a stored and verified shared secret, unique identifier, and/or account number, etc.

In block 408, the routine 400 includes sending a result of the authentication operation indicating that the contactless card is authentic (or not authentic). In embodiments, the system may send the result to a rental system and/or a computing device associated with the item based on the requesting device. In some instances, when the authentication operation fails, the result indicates that the contactless card cannot be successfully authenticated.

In block 410, the routine 400 includes receiving a payment request to pay for the rental of the item. For example, the bank system, including a payment server may receive the payment request in response to the card being successfully authenticated from a rental system or a computing device associated with the item. The payment request may include an amount for payment. In some instances, the payment request may include or be communicated with the encrypted data from the contactless card for the bank system to use to identify an account to use to pay for the rental of the item. In some instances, the payment request may include an indication that the request corresponds with the encrypted data communicated at block 402. In some embodiments, the payment request may be communicated with the encrypted data at block 402, e.g., in one or more messages communicated prior to the card being authenticated. Embodiments are not limited in this manner. The request may include additional information to process the payment including an identifier to identify an account to receive the payment, a bank name, routing number, account number, a date/time of the transaction, a location, a description, etc. In embodiments, the bank system including the payment server may be configured with one or more APIs that may be used by the rental system and/or the computing device to communicate the payment, as previously discussed.

In block 412, the routine 400 includes processing the payment request based on information in the encrypted data. In embodiments, the bank system initiates an electronic transfer of funds from the account of the user to the account associated with the item based on the information in the payment request. Embodiments are not limited in this manner.

In block 414, the routine 400 includes sending a second result of the processing of the payment request indicating that payment is successful for the rental of the item. For example, the bank system may return an indication to the rental system or the computing device indicating that the payment was processed successfully or unsuccessfully.

FIG. 5 illustrates an example of a routine 500 that may be performed by systems discussed herein. In some embodiments, the routine 500 may be performed by a rental system including a rental server, as illustrated in FIG. 3A.

In block 502, the routine 500 includes receiving encrypted data stored on a contactless card and rental data corresponding to a rental of an item from a computing device. For example, the rental system may receive the encrypted data and rental data from a computing device affixed and/or associated with the item for rent. In embodiments, the encrypted data may be a cryptogram/MAC cryptogram and the rental data may include data corresponding to rental of the item, as discussed herein.

In block 504, routine 500 includes sending the encrypted data to one or more servers to perform an authentication routine with the encrypted data. For example, the rental system may send the encrypted data to a bank system to perform one or more operations to authenticate the card and the user. In example embodiments, the rental system may utilize one or more APIs hosted by the bank system to call an authentication method(s)/operation(s) to perform on the encrypted data and pass the encrypted data to the bank system.

In block 506, the routine 500 includes receiving a result of the authentication routine indicating the contactless card is authentic (or not authentic). For example, the rental system may receive a result from the bank system. In some instances, the result may indicate that the authentication of the card and/or the user is not successful and one or both are not authentic.

In block 508, the routine 500 includes, in response to authentication of the user, performing one or more operations to enable the rental of the item. For example, the rental system may send an indication to the computing device associated with the item to permit the rental of the item. In some instances, the rental system may request payment for the rental of the item from the bank system. In some embodiments, when the card and/or the user is not authenticated, the rental system may prevent rental of the item, e.g., by sending an indication to the computing device. Embodiments are not limited in this manner.

FIG. 6 illustrates an example of a routine 600 that may be performed in accordance with embodiments discussed. In instances, the routine 600 may be performed by a computing device, such as computing device 106 that is affixed and/or coupled with an item for rent. The computing device may be configured to provide rental features for users; and as discussed herein, one-tap rental features so that a user may easily tap their contactless card on or near the computing device and proceed with using the item reducing the amount of time and steps needed to rent the item providing more convenience for the user.

In block 602, the routine 600 includes detecting a contactless card within a near-field communication (NFC) range. For example, a computing device configured to provide rental services for an item may periodically scan for radio-frequency identification tags or devices, such as contactless cards, on a periodic basis in accordance with the ISO/IEC 14443 standard. As discussed, the computing device may be configured with a display that may instruct that the desired user to present their contactless card to the computing device within a defined distances, e.g., 10 cms. In some instances, the instructions may instruct the user to tap the card on the computing device, e.g., on the display or other portion of the body or housing of the device. In some instances, the instructions may instruct the user to tap a portion of the item itself, e.g., the body or housing of the item housing the computing device. Note that embodiments are not limited to providing the rental services utilizing NFC and other wireless technologies may be utilized, e.g., Bluetooth, 802.11 standards, ZigBee, etc.

In some instances, a single tap may be used to rent the item. In other instances, the computing device may present information and data to the user on a display device. For example, the computing device may be configured to present options for the user to select for the rental of the item in a GUI displayed on the display, e.g., an amount of time for the rental. The display may also present other legal obligations for the rental of the item. For example, the rental of the item may require the user to be presented with terms and conditions of the rental and/or use instructions for the rental in a GUI on the display of the computing device. The computing device including the display, may enable the user to read through these terms and conditions and instructions on the display device. Once the user has read through them, the computing device may instruct the user to tap or bring the contactless card on or near the computing device and the one-tap operation may be used to accept the terms and conditions along with initiate the authentication and payment operations discussed herein.

In block 604, the routine 600 includes receiving encrypted data from the contactless card, the encrypted data comprising authentication information to authenticate a user. The computing device, in response to the contactless card being brought into communication range, is configured to initiate an exchange with the contactless card. The contactless card may be configured to communicate data to the computing device to be used to authenticate the card and to provide payment. As discussed herein, the contactless card is configured to generate a cryptogram or MAC cryptogram including data for authentication and/or payment. In embodiments, the data includes one or more a shared secret, a unique identifier, a customer identifier, a counter value, or a combination thereof. In some instances, the data may include an account number or other token that may be used for payment. The computing device may request the data as part of an NFC read operation and receive the cryptogram from the contactless card in one or more NFC messages.

In embodiments, the computing device may receive the data from the card and store the data in memory. In embodiments, the computing device is configured to store the data temporarily in memory ensure that confidential data is not stored permanently on the computing device. The memory may be volatile memory or non-volatile memory and configured to store the data until the data is communicated to one or other devices or systems and deleted by the computing device.

In block 606, the routine 600 includes sending the encrypted data and/or rental data to a system, the rental data corresponding to a rental of an item. In some embodiments, as discussed in FIG. 3A, the computing device is configured to send the encrypted data and the rental data to a rental system that may process the data to enable the user rent the item. The computing device may send the data over a network, such as network 108, in one or more secure messages, as discussed herein. The encrypted data may include an unaltered MAC cryptogram received from the contactless card, and the rental data may include data corresponding to the rental, e.g., a date/time of rental, a location of rental, an identifier of the item, a status of the item, etc.

In some instances, the rental data may include a desired duration for the rental, e.g., two hours, and the rental system may calculate a cost to rent the item for the desired time and retrieve payment from a bank system upfront, as discussed herein. Once the duration is over, the computing device may disable rental of the item, or determine the item is still be used and bill the user additional charges. In other instances, the system including the computing device and the rental system may be configured to not bill the user until the user is done utilizing the item. In these instances, the computing device is configured to determine when the rental of the item has ended. For example, the computing device may receive a user selection via a GUI on a touchscreen display. In another example the computing device may detect a timeout or that the item has not been used for a particular or set amount of time. The computing device, up completion of the rental, is configured to send an end date/time to the rental system to determine the cost of the rental to request payment.

In some embodiments, as discussed in FIG. 3B, the computing device may be configured to communicate directly with the bank system to authenticate the contactless card, and in some instances, and the user. In these instances, the computing device may send the encrypted data and the rental data to the one or more servers of the bank system. In this configuration, the computing device may determine the amount for the rental of the item based on one or more calculations and may send a payment request to the bank system. In these instances, the computing device may not need to send the rental data to the bank system and may only send the encrypted data to the bank system to perform the authentication operations and the payment request.

In block 608, the routine 600 includes receiving an indication to enable the rental of the item. For example, the computing device may receive from the rental system that rental of the item is permitted. The computing device may receive the indication from the rental system in response to the successful authentication of the contactless card and, in some instances, payment for the rental. Note that in some instances, the computing device may receive an indication from the rental system to deny the rental of the item.

In some instances, the computing device may receive an indication from the bank system. The indication from the bank system may indicate that the card is successfully (or not) authenticated. The indicate whether the user is authenticated or not. When payment is collected prior to rental of item, the computing device may also receive an indication from the bank system that payment for the rental was successful or not.

In block 610, the routine 600 includes causing an action to permit the rental of the item based on the indication. For example, the computing device may send a signal to a locking mechanism to unlock a lock for the item. Other examples may include sending one or more signals to apply power to the item, enable a motor of the item, provide an indication to the user on a display, etc. In embodiments, when the card and/or the user is not authenticated or payment is not able to be collected, the computing device may prevent the user from renting the item. For example, the computing device may maintain a lock for the item, prevent power from being applied, etc. Embodiments are not limited to these examples.

FIG. 7 illustrates a data transmission system 700 according to an example embodiment. As further discussed below, system 700 may include contactless card 102, computing device 106, network 702, and server 704. Although FIG. 7 illustrates single instances of the components, system 700 may include any number of components.

System 700 may include one or more contactless cards 102, which are further explained below. In some embodiments, contactless card 102 may be in wireless communication, utilizing NFC in an example, with computing device 106.

System 700 may include computing device 106, which may be a network-enabled computer. As referred to herein, a network-enabled computer may include, but is not limited to a computer device, or communications device including, e.g., a server, a network appliance, a personal computer, a workstation, a phone, a handheld PC, a personal digital assistant, a thin client, a fat client, an Internet browser, or other device. client device 106 also may be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The computing device 106 device can include a processor and a memory, and it is understood that the processing circuitry may contain additional components, including processors, memories, error and parity/CRC checkers, data encoders, anticollision algorithms, controllers, command decoders, security primitives and tamper proofing hardware, as necessary to perform the functions described herein. The client device 104 may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touch-screen, keyboard, mouse, cursor-control device, touch-screen, microphone, digital camera, video recorder or camcorder. These devices may be used to enter information and interact with the software and other devices described herein.

In some examples, computing device 106 of system 700 may execute one or more applications, such as software applications, that enable, for example, network communications with one or more components of system 700 and transmit and/or receive data.

The computing device 106 may be in communication with one or more server(s) 704 via one or more network(s) 702, and may operate as a respective front-end to back-end pair with server 704. The computing device 106 may transmit, for example from a mobile device application executing on computing device 106, one or more requests to server 704. The one or more requests may be associated with retrieving data from server 704. The server 704 may receive the one or more requests from computing device 106. Based on the one or more requests from computing device 106, server 704 may be configured to retrieve the requested data from one or more databases (not shown). Based on receipt of the requested data from the one or more databases, server 704 may be configured to transmit the received data to computing device 106, the received data being responsive to one or more requests.

System 700 may include one or more networks 702. In some examples, network 702 may be one or more of a wireless network, a wired network or any combination of wireless network and wired network, and may be configured to connect computing device 106 to server 704. For example, network 702 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11 family, 802.15 family or other IEEE 802 communication protocols, Bluetooth, NFC, Radio Frequency Identification (RFID), Wi-Fi, and/or the like.

In addition, network 702 may include, without limitation, telephone lines, fiber optics, IEEE Ethernet 802.3, a wide area network, a wireless personal area network, a LAN, or a global network such as the Internet. In addition, network 702 may support an Internet network, a wireless communication network, a cellular network, or the like, or any combination thereof, network 702 may further include one network, or any number of the exemplary types of networks mentioned above, operating as a stand-alone network or in cooperation with each other, network 702 may utilize one or more protocols of one or more network elements to which they are communicatively coupled, network 702 may translate to or from other protocols to one or more protocols of network devices. Although network 702 is depicted as a single network, it should be appreciated that according to one or more examples, network 702 may comprise a plurality of interconnected networks, such as, for example, the Internet, a service provider's network, a cable television network, corporate networks, such as credit card association networks, and home networks.

System 700 may include one or more servers 704. In some examples, server 704 may include one or more processors, which are coupled to memory. The server 704 may be configured as a central system, server or platform to control and call various data at different times to execute a plurality of workflow actions. Server 704 may be configured to connect to the one or more databases. The server 704 may be connected to at least one computing device 106.

Figure 8:
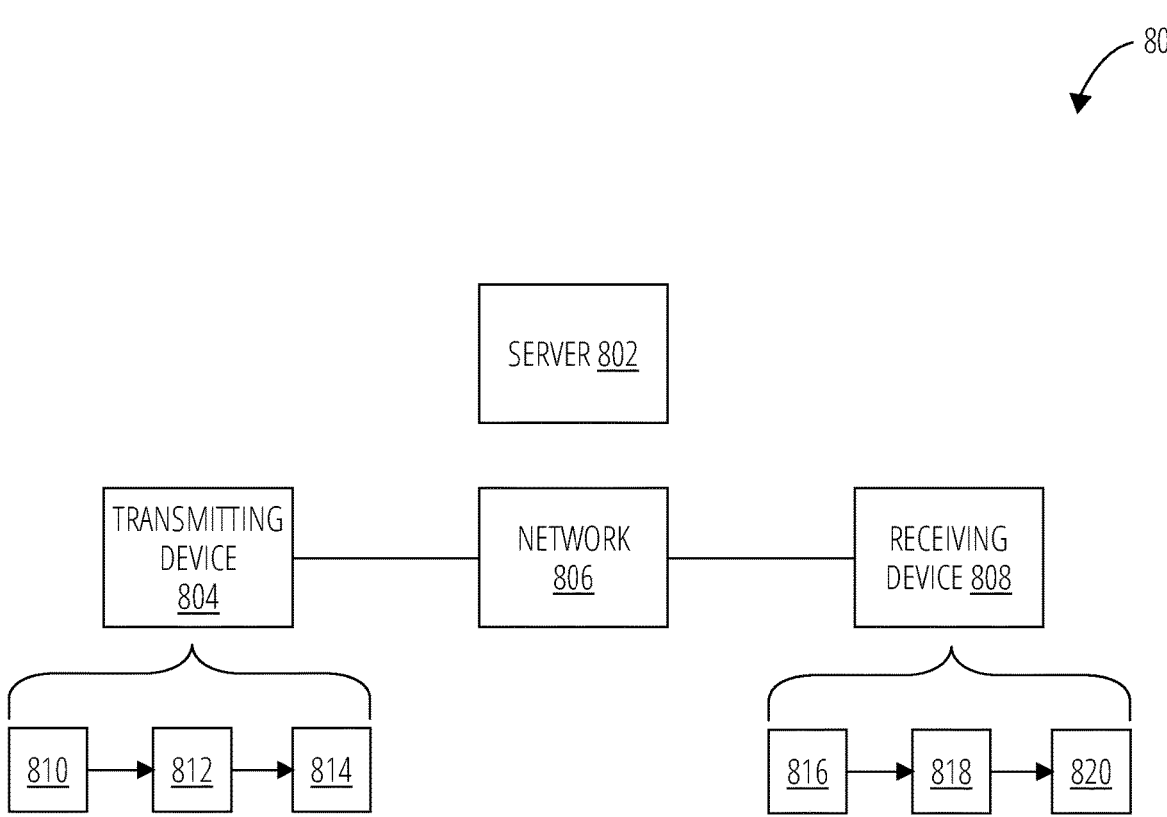
FIG. 8 illustrates an example of a system 800 in accordance with embodiments.

FIG. 8 illustrates a data transmission system according to an example embodiment. System 800 may include a transmitting or transmitting device 804, a receiving or receiving device 808 in communication, for example via network 806, with one or more servers 802. Transmitting or transmitting device 804 may be the same as, or similar to, client device 106 discussed above with reference to FIG. 1A. Receiving or receiving device 808 may be the same as, or similar to, client device 110 discussed above with reference to FIG. 1A. Network 806 may be similar to network 115 discussed above with reference to FIG. 1A. Server 802 may be similar to server 120 discussed above with reference to FIG. 1A. Although FIG. 8 shows single instances of components of system 800, system 800 may include any number of the illustrated components.

When using symmetric cryptographic algorithms, such as encryption algorithms, hash-based message authentication code (HMAC) algorithms, and cipher-based message authentication code (CMAC) algorithms, it is important that the key remain secret between the party that originally processes the data that is protected using a symmetric algorithm and the key, and the party who receives and processes the data using the same cryptographic algorithm and the same key.

It is also important that the same key is not used too many times. If a key is used or reused too frequently, that key may be compromised. Each time the key is used, it provides an attacker an additional sample of data which was processed by the cryptographic algorithm using the same key. The more data which the attacker has which was processed with the same key, the greater the likelihood that the attacker may discover the value of the key. A key used frequently may be comprised in a variety of different attacks.

Moreover, each time a symmetric cryptographic algorithm is executed, it may reveal information, such as side-channel data, about the key used during the symmetric cryptographic operation. Side-channel data may include minute power fluctuations which occur as the cryptographic algorithm executes while using the key. Sufficient measurements may be taken of the side-channel data to reveal enough information about the key to allow it to be recovered by the attacker. Using the same key for exchanging data would repeatedly reveal data processed by the same key.

However, by limiting the number of times a particular key will be used, the amount of side-channel data which the attacker is able to gather is limited and thereby reduce exposure to this and other types of attack. As further described herein, the parties involved in the exchange of cryptographic information (e.g., sender and recipient) can independently generate keys from an initial shared master symmetric key in combination with a counter value, and thereby periodically replace the shared symmetric key being used with needing to resort to any form of key exchange to keep the parties in sync. By periodically changing the shared secret symmetric key used by the sender and the recipient, the attacks described above are rendered impossible.

Referring back to FIG. 8, system 800 may be configured to implement key diversification. For example, a sender and recipient may desire to exchange data (e.g., original sensitive data) via respective devices 804 and 808. As explained above, although single instances of transmitting device 804 and receiving device 808 may be included, it is understood that one or more transmitting devices 804 and one or more receiving devices 808 may be involved so long as each party shares the same shared secret symmetric key. In some examples, the transmitting device 804 and receiving device 808 may be provisioned with the same master symmetric key. Further, it is understood that any party or device holding the same secret symmetric key may perform the functions of the transmitting device 804 and similarly any party holding the same secret symmetric key may perform the functions of the receiving device 808. In some examples, the symmetric key may comprise the shared secret symmetric key which is kept secret from all parties other than the transmitting device 804 and the receiving device 808 involved in exchanging the secure data. It is further understood that both the transmitting device 804 and receiving device 808 may be provided with the same master symmetric key, and further that part of the data exchanged between the transmitting device 804 and receiving device 808 comprises at least a portion of data which may be referred to as the counter value. The counter value may comprise a number that changes each time data is exchanged between the transmitting device 804 and the receiving device 808.

System 800 may include one or more networks 806. In some examples, network 806 may be one or more of a wireless network, a wired network or any combination of wireless network and wired network, and may be configured to connect one or more transmitting devices 804 and one or more receiving devices 808 to server 802. For example, network 806 may include one or more of a fiber optics network, a passive optical network, a cable network, an Internet network, a satellite network, a wireless LAN, a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11 family, 802.15 family, Bluetooth, NFC, RFID, Wi-Fi, and/or the like.

In addition, network 806 may include, without limitation, telephone lines, fiber optics, IEEE Ethernet 802.3, a wide area network, a wireless personal area network, a LAN, or a global network such as the Internet. In addition, network 806 may support an Internet network, a wireless communication network, a cellular network, or the like, or any combination thereof. Network 806 may further include one network, or any number of the exemplary types of networks mentioned above, operating as a stand-alone network or in cooperation with each other. Network 806 may utilize one or more protocols of one or more network elements to which they are communicatively coupled. Network 806 may translate to or from other protocols to one or more protocols of network devices. Although network 806 is depicted as a single network, it should be appreciated that according to one or more examples, network 806 may comprise a plurality of interconnected networks, such as, for example, the Internet, a service provider's network, a cable television network, corporate networks, such as credit card association networks, and home networks.

In some examples, one or more transmitting devices 804 and one or more receiving devices 808 may be configured to communicate and transmit and receive data between each other without passing through network 806. For example, communication between the one or more transmitting devices 804 and the one or more receiving devices 808 may occur via at least one of NFC, Bluetooth, RFID, Wi-Fi, and/or the like.

At block 810, when the transmitting device 804 is preparing to process the sensitive data with symmetric cryptographic operation, the sender may update a counter. In addition, the transmitting device 804 may select an appropriate symmetric cryptographic algorithm, which may include at least one of a symmetric encryption algorithm, HMAC algorithm, and a CMAC algorithm. In some examples, the symmetric algorithm used to process the diversification value may comprise any symmetric cryptographic algorithm used as needed to generate the desired length diversified symmetric key. Non-limiting examples of the symmetric algorithm may include a symmetric encryption algorithm such as 3DES or AES128; a symmetric HMAC algorithm, such as HMAC-SHA-256; and a symmetric CMAC algorithm such as AES-CMAC. It is understood that if the output of the selected symmetric algorithm does not generate a sufficiently long key, techniques such as processing multiple iterations of the symmetric algorithm with different input data and the same master key may produce multiple outputs which may be combined as needed to produce sufficient length keys.

At block 812, the transmitting device 804 may take the selected cryptographic algorithm, and using the master symmetric key, process the counter value. For example, the sender may select a symmetric encryption algorithm, and use a counter which updates with every conversation between the transmitting device 804 and the receiving device 808. The transmitting device 804 may then encrypt the counter value with the selected symmetric encryption algorithm using the master symmetric key, creating a diversified symmetric key.

In some examples, the counter value may not be encrypted. In these examples, the counter value may be transmitted between the transmitting device 804 and the receiving device 808 at block 812 without encryption.

At block 814, the diversified symmetric key may be used to process the sensitive data before transmitting the result to the receiving device 808. For example, the transmitting device 804 may encrypt the sensitive data using a symmetric encryption algorithm using the diversified symmetric key, with the output comprising the protected encrypted data. The transmitting device 804 may then transmit the protected encrypted data, along with the counter value, to the receiving device 808 for processing.

At block 816, the receiving device 808 may first take the counter value and then perform the same symmetric encryption using the counter value as input to the encryption, and the master symmetric key as the key for the encryption. The output of the encryption may be the same diversified symmetric key value that was created by the sender.

At block 818, the receiving device 808 may then take the protected encrypted data and using a symmetric decryption algorithm along with the diversified symmetric key, decrypt the protected encrypted data.

At block 820, as a result of the decrypting the protected encrypted data, the original sensitive data may be revealed.

The next time sensitive data needs to be sent from the sender to the recipient via respective transmitting device 804 and receiving device 808, a different counter value may be selected producing a different diversified symmetric key. By processing the counter value with the master symmetric key and same symmetric cryptographic algorithm, both the transmitting device 804 and receiving device 808 may independently produce the same diversified symmetric key. This diversified symmetric key, not the master symmetric key, is used to protect the sensitive data.

As explained above, both the transmitting device 804 and receiving device 808 each initially possess the shared master symmetric key. The shared master symmetric key is not used to encrypt the original sensitive data. Because the diversified symmetric key is independently created by both the transmitting device 804 and receiving device 808, it is never transmitted between the two parties. Thus, an attacker cannot intercept the diversified symmetric key and the attacker never sees any data which was processed with the master symmetric key. Only the counter value is processed with the master symmetric key, not the sensitive data. As a result, reduced side-channel data about the master symmetric key is revealed. Moreover, the operation of the transmitting device 804 and the receiving device 808 may be governed by symmetric requirements for how often to create a new diversification value, and therefore a new diversified symmetric key. In an embodiment, a new diversification value and therefore a new diversified symmetric key may be created for every exchange between the transmitting device 804 and receiving device 808.

In some examples, the key diversification value may comprise the counter value. Other non-limiting examples of the key diversification value include: a random nonce generated each time a new diversified key is needed, the random nonce sent from the transmitting device 804 to the receiving device 808; the full value of a counter value sent from the transmitting device 804 and the receiving device 808; a portion of a counter value sent from the transmitting device 804 and the receiving device 808; a counter independently maintained by the transmitting device 804 and the receiving device 808 but not sent between the two devices; a one-time-passcode exchanged between the transmitting device 804 and the receiving device 808; and a cryptographic hash of the sensitive data. In some examples, one or more portions of the key diversification value may be used by the parties to create multiple diversified keys. For example, a counter may be used as the key diversification value. Further, a combination of one or more of the exemplary key diversification values described above may be used.

In another example, a portion of the counter may be used as the key diversification value. If multiple master key values are shared between the parties, the multiple diversified key values may be obtained by the systems and processes described herein. A new diversification value, and therefore a new diversified symmetric key, may be created as often as needed. In the most secure case, a new diversification value may be created for each exchange of sensitive data between the transmitting device 804 and the receiving device 808. In effect, this may create a one-time use key, such as a single-use session key.

FIG. 9 illustrates an example configuration of a contactless card 102, which may include a contactless card, a payment card, such as a credit card, debit card, or gift card, issued by a service provider as displayed as service provider indicia 902 on the front or back of the contactless card 102. In some examples, the contactless card 102 is not related to a payment card, and may include, without limitation, an identification card. In some examples, the transaction card may include a dual interface contactless payment card, a rewards card, and so forth. The contactless card 102 may include a substrate 908, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 102 may have physical characteristics compliant with the ID-1 format of the ISO/IEC 7816 standard, and the transaction card may otherwise be compliant with the ISO/IEC 14443 standard. However, it is understood that the contactless card 102 according to the present disclosure may have different characteristics, and the present disclosure does not require a transaction card to be implemented in a payment card.

The contactless card 102 may also include identification information 906 displayed on the front and/or back of the card, and a contact pad 904. The contact pad 904 may include one or more pads and be configured to establish contact with another client device, such as an ATM, a user device, smartphone, laptop, desktop, or tablet computer via transaction cards. The contact pad may be designed in accordance with one or more standards, such as ISO/IEC 7816 standard, and enable communication in accordance with the EMV protocol. The contactless card 102 may also include processing circuitry, antenna and other components as will be further discussed in FIG. 10. These components may be located behind the contact pad 904 or elsewhere on the substrate 908, e.g. within a different layer of the substrate 908, and may electrically and physically coupled with the contact pad 904. The contactless card 102 may also include a magnetic strip or tape, which may be located on the back of the card (not shown in FIG. 9). The contactless card 102 may also include a Near-Field Communication (NFC)

device coupled with an antenna capable of communicating via the NFC protocol. Embodiments are not limited in this manner.

As illustrated in FIG. 10, the contact pad 904 of contactless card 102 may include processing circuitry 1016 for storing, processing, and communicating information, including a processor 1002, a memory 1004, and one or more interface(s) 1006. It is understood that the processing circuitry 1016 may contain additional components, including processors, memories, error and parity/CRC checkers, data encoders, anticollision algorithms, controllers, command decoders, security primitives and tamper proofing hardware, as necessary to perform the functions described herein.

The memory 1004 may be a read-only memory, write-once read-multiple memory or read/write memory, e.g., RAM, ROM, and EEPROM, and the contactless card 102 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. A read/write memory may also be read many times after leaving the factory. In some instances, the memory 1004 may be encrypted memory utilizing an encryption algorithm executed by the processor 1002 to encrypted data.

The memory 1004 may be configured to store one or more applet(s) 1008, one or more counter(s) 1010, a customer identifier 1014, and the account number(s) 1012, which may be virtual account numbers. The one or more applet(s) 1008 may comprise one or more software applications configured to execute on one or more contactless cards, such as a Java® Card applet. However, it is understood that applet(s) 1008 are not limited to Java Card applets, and instead may be any software application operable on contactless cards or other devices having limited memory. The one or more counter(s) 1010 may comprise a numeric counter sufficient to store an integer. The customer identifier 1014 may comprise a unique alphanumeric identifier assigned to a user of the contactless card 102, and the identifier may distinguish the user of the contactless card from other contactless card users. In some examples, the customer identifier 1014 may identify both a customer and an account assigned to that customer and may further identify the contactless card 102 associated with the customer's account. As stated, the account number(s) 1012 may include thousands of one-time use virtual account numbers associated with the contactless card 102. An applet(s) 1008 of the contactless card 102 may be configured to manage the account number(s) 1012 (e.g., to select an account number(s) 1012, mark the selected account number(s) 1012 as used, and transmit the account number(s) 1012 to a mobile device for autofilling by an autofilling service.

The processor 1002 and memory elements of the foregoing exemplary embodiments are described with reference to the contact pad 904, but the present disclosure is not limited thereto. It is understood that these elements may be implemented outside of the contact pad 904 or entirely separate from it, or as further elements in addition to processor 1002 and memory 1004 elements located within the contact pad 904.

In some examples, the contactless card 102 may comprise one or more antenna(s) 1018. The one or more antenna(s) 1018 may be placed within the contactless card 102 and around the processing circuitry 1016 of the contact pad 904. For example, the one or more antenna(s) 1018 may be integral with the processing circuitry 1016 and the one or more antenna(s) 1018 may be used with an external booster coil. As another example, the one or more antenna(s) 1018 may be external to the contact pad 904 and the processing circuitry 1016.

In an embodiment, the coil of contactless card 102 may act as the secondary of an air core transformer. The terminal may communicate with the contactless card 102 by cutting power or amplitude modulation. The contactless card 101 may infer the data transmitted from the terminal using the gaps in the contactless card's power connection, which may be functionally maintained through one or more capacitors. The contactless card 102 may communicate back by switching a load on the contactless card's coil or load modulation. Load modulation may be detected in the terminal's coil through interference. More generally, using the antenna(s) 1018, processor 1002, and/or the memory 1004, the contactless card 101 provides a communications interface to communicate via NFC, Bluetooth, and/or Wi-Fi communications.

As explained above, contactless card 102 may be built on a software platform operable on smart cards or other devices having limited memory, such as JavaCard, and one or more or more applications or applets may be securely executed. Applet(s) 1008 may be added to contactless cards to provide a one-time password (OTP) for multifactor authentication (MFA) in various mobile application-based use cases. Applet(s) 1008 may be configured to respond to one or more requests, such as near field data exchange requests, from a reader, such as a mobile NFC reader (e.g., of a mobile device or point-of-sale terminal), and produce an NDEF message that comprises a cryptographically secure OTP encoded as an NDEF text tag.

One example of an NDEF OTP is an NDEF short-record layout (SR-1). In such an example, one or more applet(s) 1008 may be configured to encode the OTP as an NDEF type 4 well known type text tag. In some examples, NDEF messages may comprise one or more records. The applet(s) 1008 may be configured to add one or more static tag records in addition to the OTP record.

In some examples, the one or more applet(s) 1008 may be configured to emulate an RFID tag. The RFID tag may include one or more polymorphic tags. In some examples, each time the tag is read, different cryptographic data is presented that may indicate the authenticity of the contactless card. Based on the one or more applet(s) 1008, an NFC read of the tag may be processed, the data may be transmitted to a server, such as a server of a banking system, and the data may be validated at the server.

In some examples, the contactless card 102 and server may include certain data such that the card may be properly identified. The contactless card 102 may include one or more unique identifiers (not pictured). Each time a read operation takes place, the counter(s) 1010 may be configured to increment. In some examples, each time data from the contactless card 102 is read (e.g., by a mobile device), the counter(s) 1010 is transmitted to the server for validation and determines whether the counter(s) 1010 are equal (as part of the validation) to a counter of the server.

The one or more counter(s) 1010 may be configured to prevent a replay attack. For example, if a cryptogram has been obtained and replayed, that cryptogram is immediately rejected if the counter(s) 1010 has been read or used or otherwise passed over. If the counter(s) 1010 has not been used, it may be replayed. In some examples, the counter that is incremented on the card is different from the counter that is incremented for transactions. The contactless card 101 is unable to determine the application transaction counter(s) 1010 since there is no communication between applet(s) 1008 on the contactless card 102.

In some examples, the counter(s) 1010 may get out of sync. In some examples, to account for accidental reads that initiate transactions, such as reading at an angle, the counter(s) 1010 may increment but the application does not process the counter(s) 1010. In some examples, when the mobile device 10 is woken up, NFC may be enabled and the device 110 may be configured to read available tags, but no action is taken responsive to the reads.

To keep the counter(s) 1010 in sync, an application, such as a background application, may be executed that would be configured to detect when the mobile device 110 wakes up and synchronize with the server of a banking system indicating that a read that occurred due to detection to then move the counter 1010 forward. In other examples, Hashed One Time Password may be utilized such that a window of mis-synchronization may be accepted. For example, if within a threshold of 10, the counter(s) 1010 may be configured to move forward. But if within a different threshold number, for example within 10 or 1400, a request for performing re-synchronization may be processed which requests via one or more applications that the user tap, gesture, or otherwise indicate one or more times via the user's device. If the counter(s) 1010 increases in the appropriate sequence, then it possible to know that the user has done so.

The key diversification technique described herein with reference to the counter(s) 1010, master key, and diversified key, is one example of encryption and/or decryption a key diversification technique. This example key diversification technique should not be considered limiting of the disclosure, as the disclosure is equally applicable to other types of key diversification techniques.

During the creation process of the contactless card 102, two cryptographic keys may be assigned uniquely per card. The cryptographic keys may comprise symmetric keys which may be used in both encryption and decryption of data. Triple DES (3DES) algorithm may be used by EMV and it is implemented by hardware in the contactless card 102. By using the key diversification process, one or more keys may be derived from a master key based upon uniquely identifiable information for each entity that requires a key.

In some examples, to overcome deficiencies of 3DES algorithms, which may be susceptible to vulnerabilities, a session key may be derived (such as a unique key per session) but rather than using the master key, the unique card-derived keys and the counter may be used as diversification data. For example, each time the contactless card 102 is used in operation, a different key may be used for creating the message authentication code (MAC) and for performing the encryption. This results in a triple layer of cryptography. The session keys may be generated by the one or more applets and derived by using the application transaction counter with one or more algorithms (as defined in EMV 4.3 Book 2 A1.3.1 Common Session Key Derivation).

Further, the increment for each card may be unique, and assigned either by personalization, or algorithmically assigned by some identifying information. For example, odd numbered cards may increment by 2 and even numbered cards may increment by 5. In some examples, the increment may also vary in sequential reads, such that one card may increment in sequence by 1, 3, 5, 2, 2, . . . repeating. The specific sequence or algorithmic sequence may be defined at personalization time, or from one or more processes derived from unique identifiers. This can make it harder for a replay attacker to generalize from a small number of card instances.

The authentication message may be delivered as the content of a text NDEF record in hexadecimal ASCII format. In another example, the NDEF record may be encoded in hexadecimal format.

FIG. 11 is a timing diagram illustrating an example sequence for providing authenticated access according to one or more embodiments of the present disclosure. Sequence flow 1100 may include contactless card 102 and computing device 106, which may include an application 1102 and processor 1104.

At line 1108, the application 1102 communicates with the contactless card 102 (e.g., after being brought near the contactless card 102). Communication between the application 1102 and the contactless card 102 may involve the contactless card 102 being sufficiently close to a card reader (not shown) of the computing device 106 to enable NFC data transfer between the application 1102 and the contactless card 102.

At line 1106, after communication has been established between computing device 106 and contactless card 102, contactless card 102 generates a message authentication code (MAC) cryptogram. In some examples, this may occur when the contactless card 102 is read by the application 1102. In particular, this may occur upon a read, such as an NFC read, of a near field data exchange (NDEF) tag, which may be created in accordance with the NFC Data Exchange Format. For example, a reader application, such as application 1102, may transmit a message, such as an applet select message, with the applet ID of an NDEF producing applet. Upon confirmation of the selection, a sequence of select file messages followed by read file messages may be transmitted. For example, the sequence may include "Select Capabilities file", "Read Capabilities file", and "Select NDEF file". At this point, a counter value maintained by the contactless card 102 may be updated or incremented, which may be followed by "Read NDEF file." At this point, the message may be generated which may include a header and a shared secret. Session keys may then be generated. The MAC cryptogram may be created from the message, which may include the header and the shared secret. The MAC cryptogram may then be concatenated with one or more blocks of random data, and the MAC cryptogram and a random number (RND) may be encrypted with the session key. Thereafter, the cryptogram and the header may be concatenated, and encoded as ASCII hex and returned in NDEF message format (responsive to the "Read NDEF file" message).

In some examples, the MAC cryptogram may be transmitted as an NDEF tag, and in other examples the MAC cryptogram may be included with a uniform resource indicator (e.g., as a formatted string). In some examples, application 1102 may be configured to transmit a request to contactless card 102, the request comprising an instruction to generate a MAC cryptogram.

At line 1110, the contactless card 102 sends the MAC cryptogram to the application 1102. In some examples, the transmission of the MAC cryptogram occurs via NFC, however, the present disclosure is not limited thereto. In other examples, this communication may occur via Bluetooth, Wi-Fi, or other means of wireless data communication. At line 1112, the application 1102 communicates the MAC cryptogram to the processor 1104.

At line 1114, the processor 1104 verifies the MAC cryptogram pursuant to an instruction from the application 122.

For example, the MAC cryptogram may be verified, as explained below. In some examples, verifying the MAC cryptogram may be performed by a device other than computing device 106, such as a server of a banking system in data communication with the computing device 106. For example, processor 1104 may output the MAC cryptogram for transmission to the server of the banking system, which may verify the MAC cryptogram. In some examples, the MAC cryptogram may function as a digital signature for purposes of verification. Other digital signature algorithms, such as public key asymmetric algorithms, e.g., the Digital Signature Algorithm and the RSA algorithm, or zero knowledge protocols, may be used to perform this verification.

Figure 12:
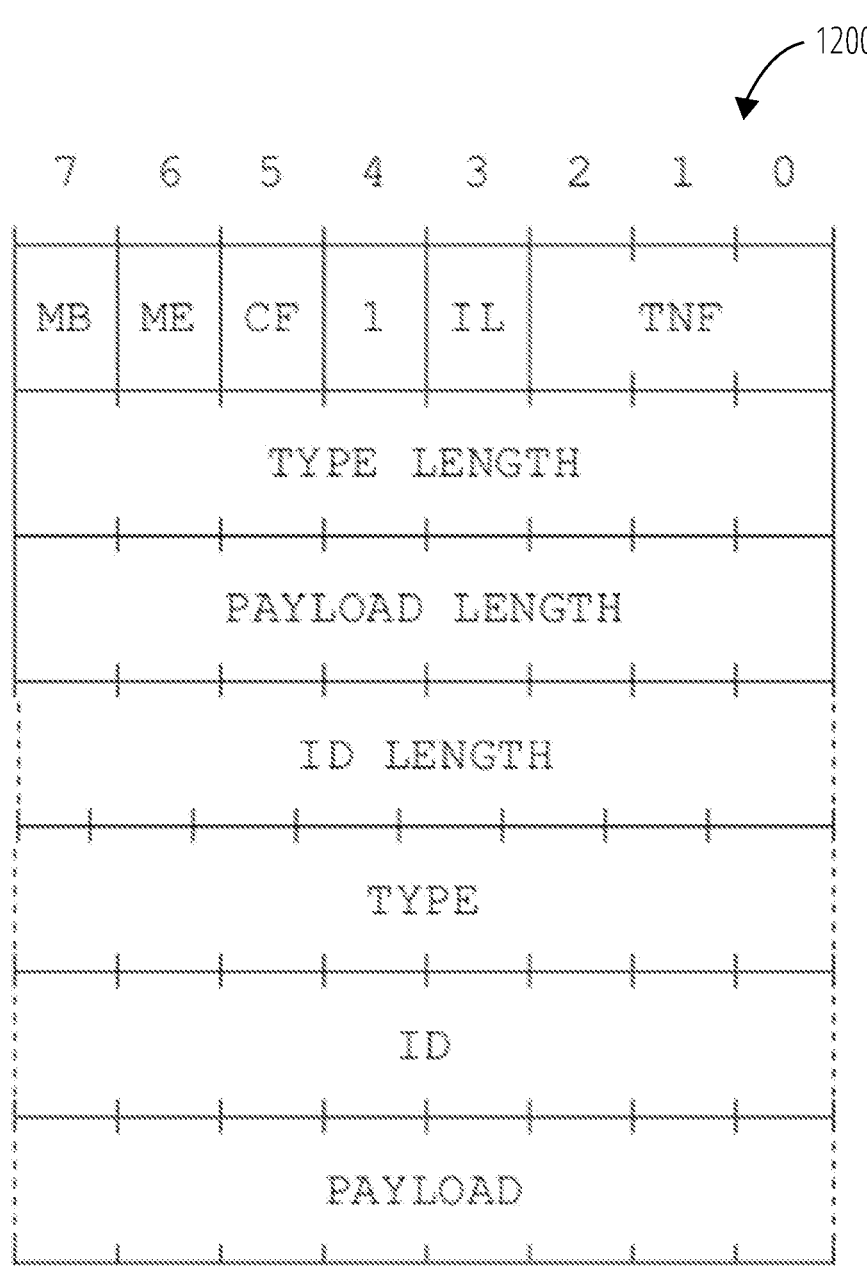
FIG. 12 illustrates a data structure 1200 in accordance with one embodiment.

FIG. 12 illustrates an NDEF short-record layout (SR=1) data structure 1200 according to an example embodiment. One or more applets may be configured to encode the OTP as an NDEF type 4 well known type text tag. In some examples, NDEF messages may comprise one or more records. The applets may be configured to add one or more static tag records in addition to the OTP record. Exemplary tags include, without limitation, Tag type: well known type, text, encoding English (en); Applet ID: D2760000850101; Capabilities: read-only access; Encoding: the authentication message may be encoded as ASCII hex; type-length-value (TLV) data may be provided as a personalization parameter that may be used to generate the NDEF message. In an embodiment, the authentication template may comprise the first record, with a well-known index for providing the actual dynamic authentication data.

Figure 13:
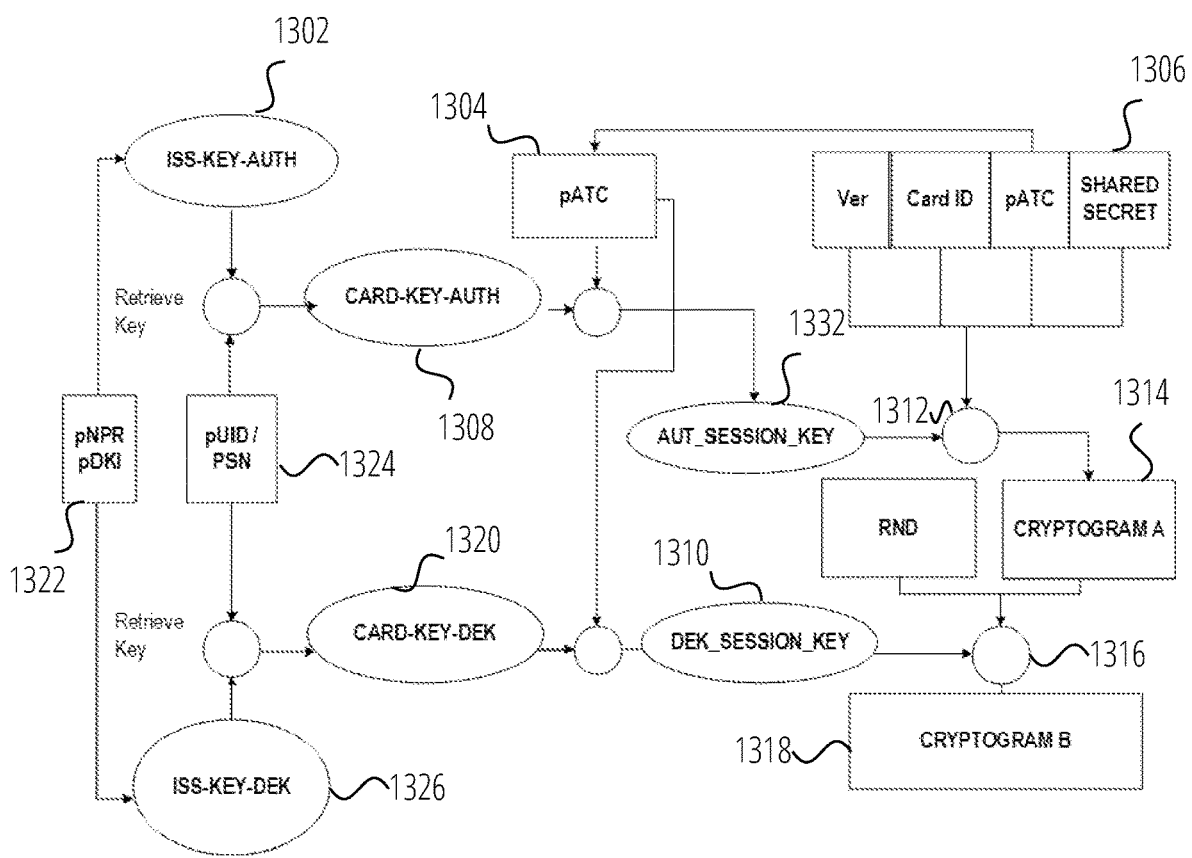
FIG. 13 is a diagram of a key system according to an example embodiment.

FIG. 13 illustrates a diagram of a system 1300 configured to implement one or more embodiments of the present disclosure. As explained below, during the contactless card creation process, two cryptographic keys may be assigned uniquely for each card. The cryptographic keys may comprise symmetric keys which may be used in both encryption and decryption of data. Triple DES (3DES) algorithm may be used by EMV and it is implemented by hardware in the contactless card. By using a key diversification process, one or more keys may be derived from a master key based upon uniquely identifiable information for each entity that requires a key.

Regarding master key management, two issuer master keys 1302, 1326 may be required for each part of the portfolio on which the one or more applets is issued. For example, the first master key 1302 may comprise an Issuer Cryptogram Generation/Authentication Key (Iss-Key-Auth) and the second master key 1326 may comprise an Issuer Data Encryption Key (Iss-Key-DEK). As further explained herein, two issuer master keys 1302, 1326 are diversified into card master keys 1308, 1320, which are unique for each card. In some examples, a network profile record ID (pNPR) 522 and derivation key index (pDKI) 1324, as back office data, may be used to identify which Issuer Master Keys 1302, 1326 to use in the cryptographic processes for authentication. The system performing the authentication may be configured to retrieve values of pNPR 1322 and pDKI 1324 for a contactless card at the time of authentication.

In some examples, to increase the security of the solution, a session key may be derived (such as a unique key per session) but rather than using the master key, the unique card-derived keys and the counter may be used as diversification data, as explained above. For example, each time the card is used in operation, a different key may be used for creating the message authentication code (MAC) and for performing the encryption. Regarding session key generation, the keys used to generate the cryptogram and encipher the data in the one or more applets may comprise session keys based on the card unique keys (Card-Key-Auth 1308 and Card-Key-Dek 1320). The session keys (Aut-Session-Key 1332 and DEK-Session-Key 1310) may be generated by the one or more applets and derived by using the application transaction counter (pATC) 1304 with one or more algorithms. To fit data into the one or more algorithms, only the 2 low order bytes of the 4-byte pATC 1304 is used. In some examples, the four byte session key derivation method may comprise: F1:=PATC(lower 2 bytes) ‖'F0'‖'00'‖PATC (four bytes) F1:=PATC(lower 2 bytes) ‖'0F'‖'00'‖PATC(four bytes) SK:={(ALG (MK) [F1])‖ALG (MK) [F2]}, where ALG may include 3DES ECB and MK may include the card unique derived master key.

As described herein, one or more MAC session keys may be derived using the lower two bytes of pATC 1304 counter. At each tap of the contactless card, pATC 1304 is configured to be updated, and the card master keys Card-Key-AUTH 908 and Card-Key-DEK 1320 are further diversified into the session keys Aut-Session-Key 1332 and DEK-Session-KEY 1310. pATC 1304 may be initialized to zero at personalization or applet initialization time. In some examples, the pATC counter 1304 may be initialized at or before personalization, and may be configured to increment by one at each NDEF read.

Further, the update for each card may be unique, and assigned either by personalization, or algorithmically assigned by pUID or other identifying information. For example, odd numbered cards may increment or decrement by 2 and even numbered cards may increment or decrement by 5. In some examples, the update may also vary in sequential reads, such that one card may increment in sequence by 1, 3, 5, 2, 2, . . . repeating. The specific sequence or algorithmic sequence may be defined at personalization time, or from one or more processes derived from unique identifiers. This can make it harder for a replay attacker to generalize from a small number of card instances.

The authentication message may be delivered as the content of a text NDEF record in hexadecimal ASCII format. In some examples, only the authentication data and an 8-byte random number followed by MAC of the authentication data may be included. In some examples, the random number may precede cryptogram A and may be one block long. In other examples, there may be no restriction on the length of the random number. In further examples, the total data (i.e., the random number plus the cryptogram) may be a multiple of the block size. In these examples, an additional 8-byte block may be added to match the block produced by the MAC algorithm. As another example, if the algorithms employed used 16-byte blocks, even multiples of that block size may be used, or the output may be automatically, or manually, padded to a multiple of that block size.

The MAC may be performed by a function key (AUT-Session-Key) 1332. The data specified in cryptogram may be processed with javacard.signature method: ALG_DES_MAC8_ISO9797_1_M2_ALG3 to correlate to EMV ARQC verification methods. The key used for this computation may comprise a session key AUT-Session-Key 1332, as explained above. As explained above, the low order two bytes of the counter may be used to diversify for the one or more MAC session keys. As explained below, AUT-Session-Key 1332 may be used to MAC data 1306, and the resulting data or cryptogram A 1314 and random number RND may be encrypted using DEK-Session-Key 1310 to create cryptogram B or output 1318 sent in the message.

In some examples, one or more HSM commands may be processed for decrypting such that the final 16 (binary, 32 hex) bytes may comprise a 3DES symmetric encrypting using CBC mode with a zero IV of the random number followed by MAC authentication data. The key used for this encryption may comprise a session key DEK-Session-Key 1310 derived from the Card-Key-DEK 1320. In this case, the ATC value for the session key derivation is the least significant byte of the counter pATC 1304.

The format in FIG. 17 represents a binary version example embodiment. Further, in some examples, the first byte may be set to ASCII 'A'.

Another exemplary format is shown in FIG. 18. In this example, the tag may be encoded in hexadecimal format.

The UID field of the received message may be extracted to derive, from master keys Iss-Key-AUTH 902 and Iss-Key-DEK 1326, the card master keys (Card-Key-Auth 1308 and Card-Key-DEK 1320) for that particular card. Using the card master keys (Card-Key-Auth 908 and Card-Key-DEK 1320), the counter (pATC) field of the received message may be used to derive the session keys (Aut-Session-Key 1332 and DEK-Session-Key 1310) for that particular card. Cryptogram B 1318 may be decrypted using the DEK-Session-KEY, which yields cryptogram A 1314 and RND, and RND may be discarded. The UID field may be used to look up the shared secret of the contactless card which, along with the Ver, UID, and pATC fields of the message, may be processed through the cryptographic MAC using the re-created Aut-Session-Key to create a MAC output, such as MAC'. If MAC' is the same as cryptogram A 1314, then this indicates that the message decryption and MAC checking have all passed. Then the pATC may be read to determine if it is valid.

During an authentication session, one or more cryptograms may be generated by the one or more applications. For example, the one or more cryptograms may be generated as a 3DES MAC using ISO 9797-1 Algorithm 3 with Method 2 padding via one or more session keys, such as Aut-Session-Key 1332. The input data 1306 may take the following form: Version (2), pUID (8), pATC (4), Shared Secret (4). In some examples, the numbers in the brackets may comprise length in bytes. In some examples, the shared secret may be generated by one or more random number generators which may be configured to ensure, through one or more secure processes, that the random number is unpredictable. In some examples, the shared secret may comprise a random 4-byte binary number injected into the card at personalization time that is known by the authentication service. During an authentication session, the shared secret may not be provided from the one or more applets to the mobile application. Method 2 padding may include adding a mandatory 0x'80' byte to the end of input data and 0x'00' bytes that may be added to the end of the resulting data up to the 8-byte boundary. The resulting cryptogram may comprise 8 bytes in length.

In some examples, one benefit of encrypting an unshared random number as the first block with the MAC cryptogram, is that it acts as an initialization vector while using CBC (Block chaining) mode of the symmetric encryption algorithm. This allows the "scrambling" from block to block without having to pre-establish either a fixed or dynamic IV.

By including the application transaction counter (pATC) as part of the data included in the MAC cryptogram, the authentication service may be configured to determine if the value conveyed in the clear data has been tampered with. Moreover, by including the version in the one or more cryptograms, it is difficult for an attacker to purposefully misrepresent the application version in an attempt to downgrade the strength of the cryptographic solution. In some examples, the pATC may start at zero and be updated by 1 each time the one or more applications generates authentication data. The authentication service may be configured to track the pATCs used during authentication sessions. In some examples, when the authentication data uses a pATC equal to or lower than the previous value received by the authentication service, this may be interpreted as an attempt to replay an old message, and the authenticated may be rejected. In some examples, where the pATC is greater than the previous value received, this may be evaluated to determine if it is within an acceptable range or threshold, and if it exceeds or is outside the range or threshold, verification may be deemed to have failed or be unreliable. In the MAC operation 1312, data 1306 is processed through the MAC using Aut-Session-Key 1332 to produce MAC output (cryptogram A) 1314, which is encrypted.

In order to provide additional protection against brute force attacks exposing the keys on the card, it is desirable that the MAC cryptogram 1314 be enciphered. In some examples, data or cryptogram A 1314 to be included in the ciphertext may comprise: Random number (8), cryptogram (8). In some examples, the numbers in the brackets may comprise length in bytes. In some examples, the random number may be generated by one or more random number generators which may be configured to ensure, through one or more secure processes, that the random number is unpredictable. The key used to encipher this data may comprise a session key. For example, the session key may comprise DEK-Session-Key 1310. In the encryption operation 1316, data or cryptogram A 1314 and RND are processed using DEK-Session-Key 610 to produce encrypted data, cryptogram B 1318. The data 1314 may be enciphered using 3DES in cipher block chaining mode to ensure that an attacker must run any attacks over all of the ciphertext. As a non-limiting example, other algorithms, such as Advanced Encryption Standard (AES), may be used. In some examples, an initialization vector of 0x'0000000000000000' may be used. Any attacker seeking to brute force the key used for enciphering this data will be unable to determine when the correct key has been used, as correctly decrypted data will be indistinguishable from incorrectly decrypted data due to its random appearance.

In order for the authentication service to validate the one or more cryptograms provided by the one or more applets, the following data must be conveyed from the one or more applets to the mobile device in the clear during an authentication session: version number to determine the cryptographic approach used and message format for validation of the cryptogram, which enables the approach to change in the future; pUID to retrieve cryptographic assets, and derive the card keys; and pATC to derive the session key used for the cryptogram.

FIG. 14 illustrates a method 1400 for generating a cryptogram. For example, at block 1402, a network profile record ID (pNPR) and derivation key index (pDKI) may be used to identify which Issuer Master Keys to use in the cryptographic processes for authentication. In some examples, the method may include performing the authentication to retrieve values of pNPR and pDKI for a contactless card at the time of authentication.

At block 1404, Issuer Master Keys may be diversified by combining them with the card's unique ID number (pUID) and the PAN sequence number (PSN) of one or more applets, for example, a payment applet.

At block 1406, Card-Key-Auth and Card-Key-DEK (unique card keys) may be created by diversifying the Issuer Master Keys to generate session keys which may be used to generate a MAC cryptogram.

At block 1408, the keys used to generate the cryptogram and encipher the data in the one or more applets may comprise the session keys of block 1030 based on the card unique keys (Card-Key-Auth and Card-Key-DEK). In some examples, these session keys may be generated by the one or more applets and derived by using pATC, resulting in session keys Aut-Session-Key and DEK-Session-Key.

FIG. 15 depicts an exemplary process 1500 illustrating key diversification according to one example. Initially, a sender and the recipient may be provisioned with two different master keys. For example, a first master key may comprise the data encryption master key, and a second master key may comprise the data integrity master key. The sender has a counter value, which may be updated at block 1502, and other data, such as data to be protected, which it may secure share with the recipient.

At block 1504, the counter value may be encrypted by the sender using the data encryption master key to produce the data encryption derived session key, and the counter value may also be encrypted by the sender using the data integrity master key to produce the data integrity derived session key. In some examples, a whole counter value or a portion of the counter value may be used during both encryptions.

In some examples, the counter value may not be encrypted. In these examples, the counter may be transmitted between the sender and the recipient in the clear, i.e., without encryption.

At block 1506, the data to be protected is processed with a cryptographic MAC operation by the sender using the data integrity session key and a cryptographic MAC algorithm. The protected data, including plaintext and shared secret, may be used to produce a MAC using one of the session keys (AUT-Session-Key).

At block 1508, the data to be protected may be encrypted by the sender using the data encryption derived session key in conjunction with a symmetric encryption algorithm. In some examples, the MAC is combined with an equal amount of random data, for example each 8 bytes long, and then encrypted using the second session key (DEK-Session-Key).

At block 1510, the encrypted MAC is transmitted, from the sender to the recipient, with sufficient information to identify additional secret information (such as shared secret, master keys, etc.), for verification of the cryptogram.

At block 1512, the recipient uses the received counter value to independently derive the two derived session keys from the two master keys as explained above.

At block 1514, the data encryption derived session key is used in conjunction with the symmetric decryption operation to decrypt the protected data. Additional processing on the exchanged data will then occur. In some examples, after the MAC is extracted, it is desirable to reproduce and match the MAC. For example, when verifying the cryptogram, it may be decrypted using appropriately generated session keys. The protected data may be reconstructed for verification. A MAC operation may be performed using an appropriately generated session key to determine if it matches the decrypted MAC. As the MAC operation is an irreversible process, the only way to verify is to attempt to recreate it from source data.

At block 1516, the data integrity derived session key is used in conjunction with the cryptographic MAC operation to verify that the protected data has not been modified.

Some examples of the methods described herein may advantageously confirm when a successful authentication is determined when the following conditions are met. First, the ability to verify the MAC shows that the derived session key was proper. The MAC may only be correct if the decryption was successful and yielded the proper MAC value. The successful decryption may show that the correctly derived encryption key was used to decrypt the encrypted MAC. Since the derived session keys are created using the master keys known only to the sender (e.g., the transmitting device) and recipient (e.g., the receiving device), it may be trusted that the contactless card which originally created the MAC and encrypted the MAC is indeed authentic. Moreover, the counter value used to derive the first and second session keys may be shown to be valid and may be used to perform authentication operations.

Thereafter, the two derived session keys may be discarded, and the next iteration of data exchange will update the counter value (returning to block 1502) and a new set of session keys may be created (at block 1510). In some examples, the combined random data may be discarded.

Figure 16:
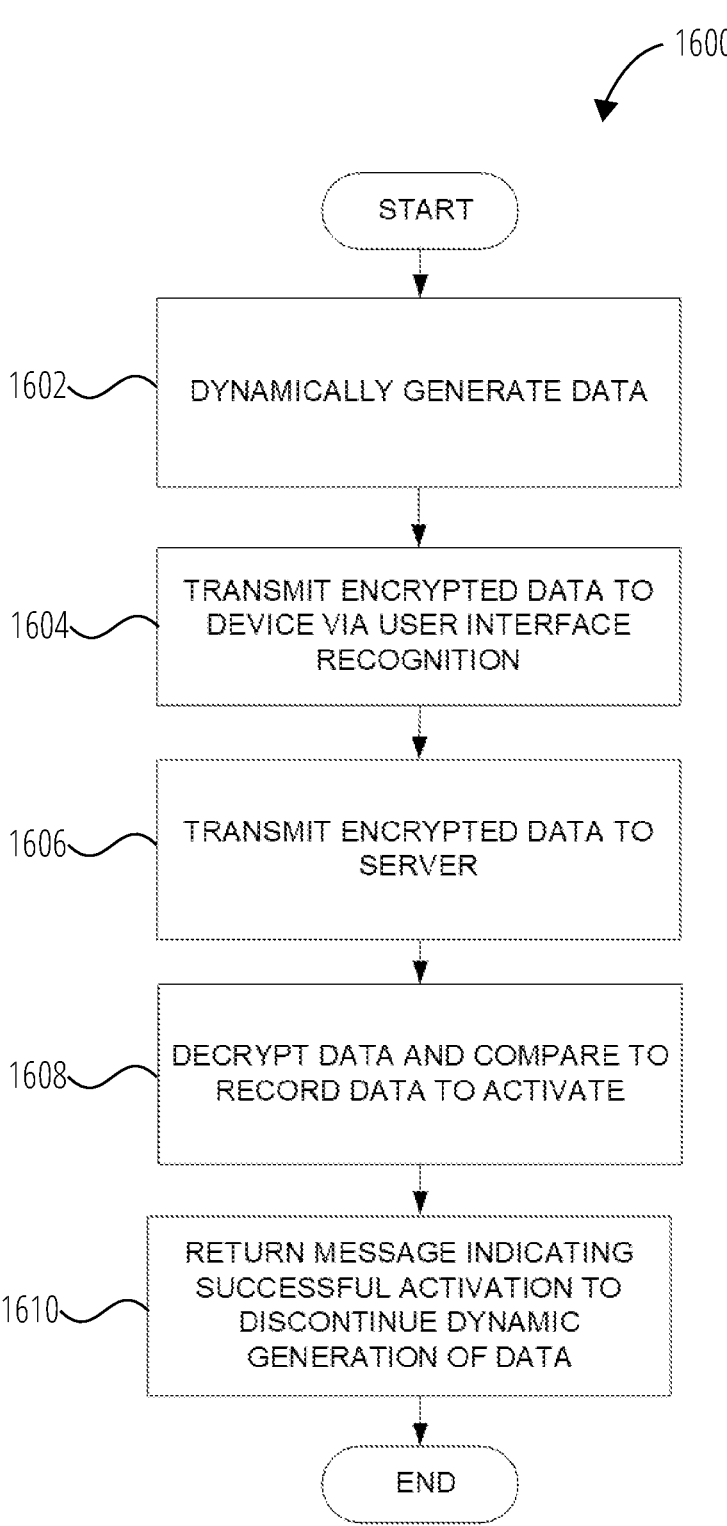
FIG. 16 illustrates an aspect of the subject matter in accordance with one embodiment.

FIG. 16 illustrates a method 1600 for card activation according to an example embodiment. For example, card activation may be completed by a system including a card, a device, and one or more servers. The contactless card, device, and one or more servers may reference same or similar components that were previously explained a, such as contactless card 102, computing device 106, and a server.

In block 1602, the card may be configured to dynamically generate data. In some examples, this data may include information such as an account number, card identifier, card verification value, or phone number, which may be transmitted from the card to the device. In some examples, one or more portions of the data may be encrypted via the systems and methods disclosed herein.

In block 1604, one or more portions of the dynamically generated data may be communicated to an application of the device via NFC or other wireless communication. For example, a tap of the card proximate to the device may allow the application of the device to read the one or more portions of the data associated with the contactless card. In some examples, if the device does not comprise an application to assist in activation of the card, the tap of the card may direct the device or prompt the customer to a software application store to download an associated application to activate the card. In some examples, the user may be prompted to sufficiently gesture, place, or orient the card towards a surface of the device, such as either at an angle or flatly placed on, near, or proximate the surface of the device. Responsive to a sufficient gesture, placement and/or orientation of the card, the device may proceed to transmit the one or more encrypted portions of data received from the card to the one or more servers.

In block 1606, the one or more portions of the data may be communicated to one or more servers, such as a card issuer server. For example, one or more encrypted portions of the data may be transmitted from the device to the card issuer server for activation of the card.

In block 1608, the one or more servers may decrypt the one or more encrypted portions of the data via the systems and methods disclosed herein. For example, the one or more servers may receive the encrypted data from the device and may decrypt it in order to compare the received data to record data accessible to the one or more servers. If a resulting comparison of the one or more decrypted portions of the data by the one or more servers yields a successful match, the card may be activated. If the resulting comparison of the one or more decrypted portions of the data by the one or more servers yields an unsuccessful match, one or more processes may take place. For example, responsive to the determination of the unsuccessful match, the user may be prompted to tap, swipe, or wave gesture the card again. In this case, there may be a predetermined threshold comprising a number of attempts that the user is permitted to activate the card. Alternatively, the user may receive a notification, such as a message on his or her device indicative of the unsuccessful attempt of card verification and to call, email or text an associated service for assistance to activate the card, or another notification, such as a phone call on his or her device indicative of the unsuccessful attempt of card verification and to call, email or text an associated service for assistance to activate the card, or another notification, such as an email indicative of the unsuccessful attempt of card verification and to call, email or text an associated service for assistance to activate the card.

In block 1610, the one or more servers may transmit a return message based on the successful activation of the card. For example, the device may be configured to receive output from the one or more servers indicative of a successful activation of the card by the one or more servers. The device may be configured to display a message indicating successful activation of the card. Once the card has been activated, the card may be configured to discontinue dynamically generating data so as to avoid fraudulent use. In this manner, the card may not be activated thereafter, and the one or more servers are notified that the card has already been activated.

What is claimed is:

1. A system configured to perform authentication and payment operations based on data stored in contactless cards, comprising:

one or more servers comprising one or more processors and memory, the memory coupled with the one or more processors and configured to store instructions that when executed by the one or more processors, cause the one or more processors to:

activate a tap-to-rent feature of a contactless card, wherein activation of the rent feature involves acceptance of terms and conditions for a rental system;

receive, from a computing device of a rental system affixed to or integrated with an item, encrypted data and rental data corresponding to a rental of the item, the encrypted data comprising authentication information received by the computing device from the contactless card via a short-range wireless communication interface of the computing device, the authentication information comprising information associated with a payment account for the contactless card, wherein the rental data comprises an item identifier and a location;

extract the authentication information from the encrypted data;

perform an authentication operation on the authentication information to authenticate the contactless card;

send, to the rental system, a result of the authentication operation, wherein the sending the result of the authentication operation indicates that the contactless card is authentic and indicates acceptance of terms and conditions;

receive, from the rental system, a payment request to pay for the rental of the item in response to the contactless card being authentic;

process the payment request based on the rental data and the information associated with the payment account in the encrypted data; and release a brake, unlock a lock, unlock a locker, or enable a motor of the item to enable the item via the rental system.

2. The system of claim 1, wherein the authentication information comprises a unique identifier to identify the contactless card, and the authentication information is encrypted with a second key and one or more cryptographic algorithms by the contactless card to generate the encrypted data.

3. The system of claim 1, wherein the authentication information comprises a counter value, and the one or more processors, to perform the authentication operation, verify the counter value based on a stored counter value.

4. The system of claim 1, wherein the authentication information comprises a shared secret, and the one or more processors, to perform the authentication operation, verify the shared secret with a stored shared secret.

5. The system of claim 1, wherein the encrypted data is encrypted with a second key generated by the contactless card based on a first key, and the one or more processors, to perform the authentication operation, generate a third key using a stored first key, decrypt the encrypted data with the third key, and verify the encrypted data is successfully decrypted with the third key.

6. The system of claim 1, wherein the one or more processors receive the encrypted data from a rental server of the rental system based on a command of an application programming interface (API) invoked by the rental server of the rental system invoking an authentication method provided by the one or more servers.

7. The system of claim 1, wherein the one or more processors receive the payment request from a rental server of the rental system based on a command of an application programming interface (API) invoked by the rental server of the rental system invoking a payment method provided by the one or more servers.

8. A computer-implemented method for authentication and payment operations based on data stored in contactless cards, comprising:

activating a tap-to-rent feature of a contactless card, wherein activation of the rent feature involves acceptance of terms and conditions for a rental system;

receiving, by one or more servers comprising one or more processors and memory, from a computing device of a rental system affixed to or integrated with an item, encrypted data and rental data corresponding to a rental of the item, the encrypted data comprising authentication information received by the computing device from the contactless card via a short-range wireless communication interface of the computing device, the authentication information comprising information associated with a payment account for the contactless card, wherein the rental data comprises an item identifier and a location;

extracting, by the one or more servers, the authentication information from the encrypted data;

performing, by the one or more servers, an authentication operation on the authentication information to authenticate the contactless card;

sending, by the one or more servers, to the rental system, a result of the authentication operation, wherein the sending the result of the authentication operation indicates that the contactless card is authentic and indicates acceptance of terms and conditions;

receiving, by the one or more servers, from the rental system, a payment request to pay for the rental of the item in response to the contactless card being authentic;

processing, by the one or more servers, the payment request based on the rental data and the information associated with the payment account in the encrypted data; and releasing a brake, unlock a lock, unlock a locker, or enable a motor of the item to enable the item via the rental system.

9. The computer-implemented method of claim 8, wherein the authentication information comprises a unique identifier to identify the contactless card, and the authentication information is encrypted with a second key and one or more cryptographic algorithms by the contactless card to generate the encrypted data.

10. The computer-implemented method of claim 8, wherein the authentication information comprises a counter value, and the authentication operation comprises verifying the counter value based on a stored counter value.

11. The computer-implemented method of claim 8, wherein the authentication information comprises a shared secret, and the authentication operation comprises verifying the shared secret with a stored shared secret.

12. The computer-implemented method of claim 8, wherein the encrypted data is encrypted with a second key generated by the contactless card based on a first key, and the authentication operation comprises:
   generating a third key using a stored first key;
   decrypting the encrypted data with the third key; and
   verifying the encrypted data is successfully decrypted with the third key.

13. The computer-implemented method of claim 8, wherein the one or more servers receive the encrypted data and the payment request from a rental server of the rental system based on respective commands of an application programming interface (API) invoked by the rental server of the rental system invoking an authentication method provided by the one or more servers.

14. A computer readable non-transitory medium comprising computer-executable instructions that are executed on a processor for authentication and payment operations based on data stored in contactless cards, the computer-executable instructions comprising the steps of:
   activating a tap-to-rent feature of a contactless card, wherein activation of the rent feature involves acceptance of terms and conditions for a rental system;
   receiving, from a computing device of a rental system affixed to or integrated with an item, rental data corresponding to a rental of the item, and encrypted data from the contactless card, the encrypted data comprising authentication information received by the computing device from the contactless card via a short-range wireless communication interface of the computing device, the authentication information comprising information associated with a payment account for the contactless card, wherein the rental data comprises an item identifier and a location;
   extracting the authentication information from the encrypted data;
   performing an authentication operation on the authentication information to authenticate the contactless card;
   sending, to the rental system, a result of the authentication operation, wherein the sending the result of the authentication operation indicates that the contactless card is authentic and indicates acceptance of terms and conditions;
   receiving, from the rental system, a payment request to pay for the rental of the item in response to the contactless card being authentic;
   processing the payment request based on the rental data and the information associated with the payment account in the encrypted data; and
   releasing a brake, unlock a lock, unlock a locker, or enable a motor of the item to enable the item via the rental system.

15. The computer readable non-transitory medium of claim 14, wherein the authentication information comprises a unique identifier to identify the contactless card, and the authentication information is encrypted with a second key and one or more cryptographic algorithms by the contactless card to generate the encrypted data.

16. The computer readable non-transitory medium of claim 14, wherein the authentication information comprises a counter value, and the authentication operation comprises verifying the counter value based on a stored counter value.

17. The computer readable non-transitory medium of claim 14, wherein the authentication information comprises a shared secret, and the authentication operation comprises verifying the shared secret with a stored shared secret.

18. The computer readable non-transitory medium of claim 14, wherein the encrypted data is encrypted with a second key generated from a first key by the contactless card, and the authentication operation comprises:
   generating a third key using a stored first key;
   decrypting the encrypted data with the third key; and
   verifying the encrypted data is successfully decrypted with the third key.

* * * * *